United States Patent
Takamatsu et al.

(10) Patent No.: US 12,166,936 B2
(45) Date of Patent: Dec. 10, 2024

(54) IMAGE READING DEVICE AND IMAGE READING METHOD OF IMAGE READING DEVICE

(71) Applicant: SEIKO EPSON CORPORATION, Tokyo (JP)

(72) Inventors: Seiji Takamatsu, Kitakyushu (JP); Yusuke Fukasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/484,091

(22) Filed: Oct. 10, 2023

(65) Prior Publication Data
US 2024/0129417 A1 Apr. 18, 2024

(30) Foreign Application Priority Data

Oct. 12, 2022 (JP) ................................. 2022-163740
Oct. 12, 2022 (JP) ................................. 2022-163741

(51) Int. Cl.
*H04N 1/00* (2006.01)

(52) U.S. Cl.
CPC ..... *H04N 1/00822* (2013.01); *H04N 1/00811* (2013.01); *H04N 1/00814* (2013.01); *H04N 1/00824* (2013.01); *H04N 1/00896* (2013.01); *H04N 1/00904* (2013.01); *H04N 1/00907* (2013.01)

(58) Field of Classification Search
CPC ........... H04N 1/00822; H04N 1/00811; H04N 1/00814; H04N 1/00824; H04N 1/00896; H04N 1/00904; H04N 1/00907; G06F 1/3206; G06F 1/3296; G06F 13/4068; Y02D 10/00; Y02D 30/50

USPC ......................................................... 358/1.15
See application file for complete search history.

(56) References Cited

U.S. PATENT DOCUMENTS

| | | | |
|---|---|---|---|
| 2004/0161257 A1* | 8/2004 | Ishihara | G06K 15/00 399/81 |
| 2013/0061079 A1* | 3/2013 | Kataoka | G06F 3/1229 713/323 |
| 2013/0163056 A1* | 6/2013 | Hanayama | H04N 1/00037 358/474 |
| 2014/0164805 A1* | 6/2014 | Hasui | G06F 1/3253 713/323 |
| 2015/0264208 A1* | 9/2015 | Achiwa | H04N 1/00885 358/1.15 |
| 2016/0034026 A1 | 2/2016 | Hanayama | |
| 2016/0316087 A1* | 10/2016 | Hanayama | H04N 1/00037 |

(Continued)

FOREIGN PATENT DOCUMENTS

JP 2016-32239 A 3/2016

*Primary Examiner* — Negussie Worku
(74) *Attorney, Agent, or Firm* — WORKMAN NYDEGGER

(57) ABSTRACT

The image reading device includes a reading section configured to read an image from a document, a control section configured to perform control related to the reading of the image from the document, a display section configured to display information, and a USB coupling section configured to couple with a USB cable. The control section control to switch to any one of a plurality of mode types. When a power source is turned on, a control section determines one of a plurality of mode types based on USB negotiation, and then makes a liquid crystal display section display information that enables identifying the decided-on mode.

20 Claims, 10 Drawing Sheets

(56) References Cited

U.S. PATENT DOCUMENTS

2016/0352947 A1\* 12/2016 Chiba ................ G06K 15/4055
2020/0310705 A1\* 10/2020 Kato ..................... H02J 7/0063
2021/0306501 A1\* 9/2021 Hayashi ............ H04N 1/00907
2023/0062398 A1\* 3/2023 Harada .................. H01R 24/62
2023/0063866 A1\* 3/2023 Harada .................... B41J 29/38

\* cited by examiner

| CONTROL CONTENTS | | MODE | | |
|---|---|---|---|---|
| | | HIGH-OUTPUT MODE | MIDDLE-OUTPUT MODE | LOW-OUTPUT MODE |
| POWER CONSUMPTION OF CONTROL SECTION | | NORMAL | LOW | MINIMUM |
| READING SPEED | 90ppm | ○ | × | × |
| | 20ppm | ○ | ○ | × |
| | 5ppm | ○ | ○ | ○ |
| DOCUMENT TYPE | THIN PAPER | ○ | ○ | ○ |
| | THICK PAPER | ○ | × | × |
| CARRIER SHEET | | ○ | × | × |
| DETECTING MULTIFEED | | ○ | × | × |
| DOCUMENT PROTECTION | | ○ | ○ | × |
| POSTURE DRIVING | | ○ | ○ | × |
| TRAY DRIVING | | ○ | × | × |
| WIRELESS COMMUNICATION | NORMAL | ○ | ○ | × |
| | READING | ○ | × | × |
| WIRED COMMUNICATION | NORMAL | ○ | ○ | ○ |
| | READING | ○ | ○ | × |
| LIQUID CRYSTAL DISPLAY | | ○ | ○ | × |
| TOUCH PANEL | | ○ | ○ | × |
| USB MEMORY | | ○ | × | × |

FIG. 6

| MODE | LUMINOUS CONDITION | LCD DISPLAY CONTENTS | AUDIO OUTPUT CONTENTS |
|---|---|---|---|
| HIGH-OUTPUT | LIGHTS GREEN | INDICATE MODE-TYPE | FIRST SOUND |
| MIDDLE-OUTPUT | BLINKING GREEN | INDICATE MODE-TYPE | SECOND SOUND |
| LOW-OUTPUT | LIGHTS YELLOW | INDICATE MODE-TYPE | THIRD SOUND |
| DECREASING OUTPUT | — | INDICATE MODE-DECREASING | WARNING SOUND |
| SHUTDOWN | LIGHTS RED | SHUTDOWN INDICATION | SHUTDOWN SOUND |

FIG. 8

IMAGE READING DEVICE AND IMAGE READING METHOD OF IMAGE READING DEVICE

The present application is based on, and claims priority from JP Application Serial Number 2022-163740, filed Oct. 12, 2022, and JP Application Serial Number 2022-163741, filed Oct. 12, 2022, the disclosures of which are hereby incorporated by reference herein in their entirety.

BACKGROUND

1. Technical Field

The present disclosure relates to an image reading device configured to read an image from a document, and an image reading method for the image reading device.

2. Related Art

For example, JP-A 2016-32239 discloses an image reading device configured to couple to a USB device. In the image reading device, when the USB device such as a terminal device is coupled to the image reading device, power can be supplied from the USB device. Such a image reading device can be controlled to any one of a plurality of types of modes having different power consumption in connection with coupling with a USB device. The plurality of types of modes includes a standard mode and a power saving mode in which power consumption is smaller than in the standard mode. The image reading device can be controlled to a power saving mode when reading of an image is not performed. In the image reading device, when image reading is instructed while the image reading device is controlled to the power saving mode, the image reading device can be controlled to the standard mode.

However, in such an image reading device, it is desired to improve the convenience of the user by providing the user with useful information associated with the power supplied from the USB device when the image reading device is coupled to the USB device.

SUMMARY

An image reading device, that solves the above problem, includes a reading section configured to read an image from a document, a control section configured to perform control related to the reading of an image from the document, a display section configured to display information, and a USB coupling section configured to couple with a USB cable, wherein the control section is configured to control to any mode amongst a plurality of types of modes with different power consumption, and when power is turned on, the control section decides on one of the plurality of mode types based on a USB negotiation, and then causes the display section to display information that enables identifying the decided-on mode.

An image reading method of an image reading device, the image reading device including a reading section configured to read an image from a document, a control section configured to perform control related to the reading of the image from the document, a display section configured to display information, and a USB coupling section configured to couple with a USB cable, the image reading method, that solves the above problem, when power is turned on, the control section decides on one of a plurality of mode types having different power consumption based on a USB negotiation, and then causes the display section to display information that enables identifying the decided-on mode.

BRIEF DESCRIPTION OF THE DRAWINGS

FIG. 6 is a schematic diagram showing control contents for each of a plurality of types of modes.

FIG. 8 is a schematic diagram showing a notification mode.

DESCRIPTION OF EMBODIMENTS

First Embodiment

Hereinafter, an embodiment of the image reading device will be described with reference to the drawings. The image reading device is, for example, a sheet feed scanner in which a fixed reading section reads a document such as a paper or a film to be transported. The image reading device is not limited to the sheet feed scanner, and may be a flatbed scanner.

Configuration of Image Reading Device 11

Figure 1:
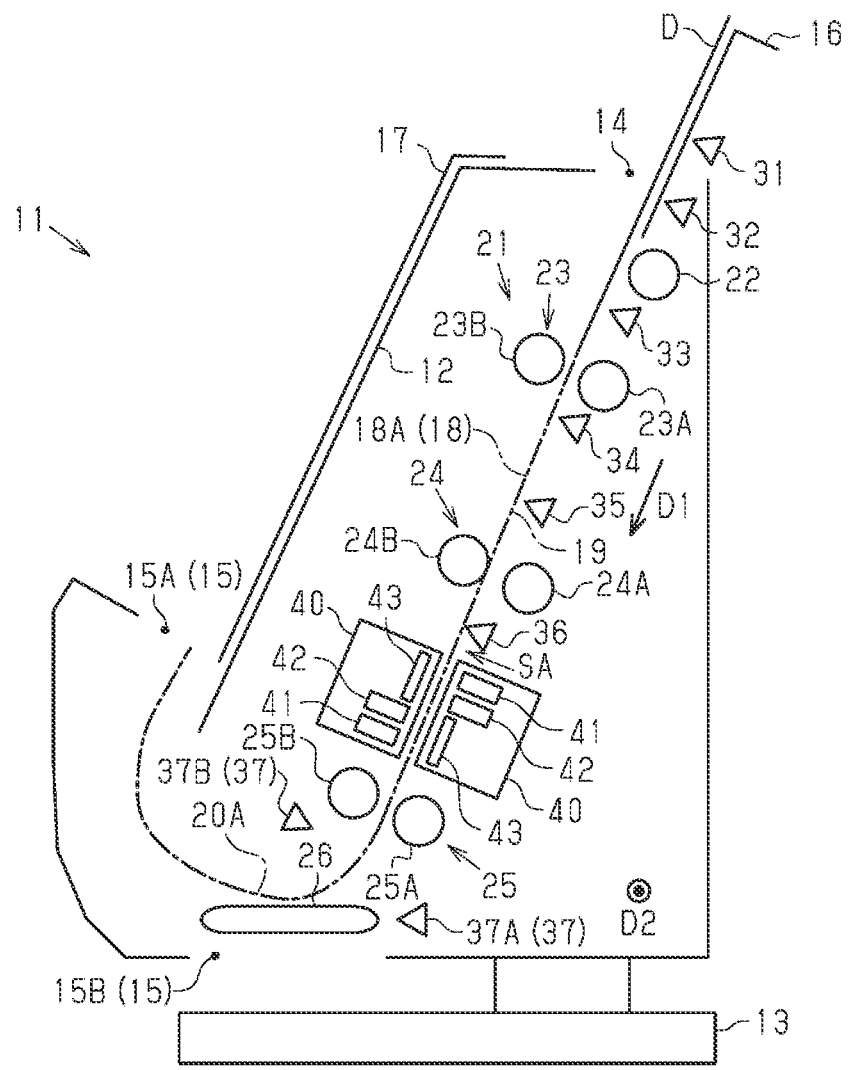
FIG. 1 is a side view of an image reading device in a first posture.
Figure 2:
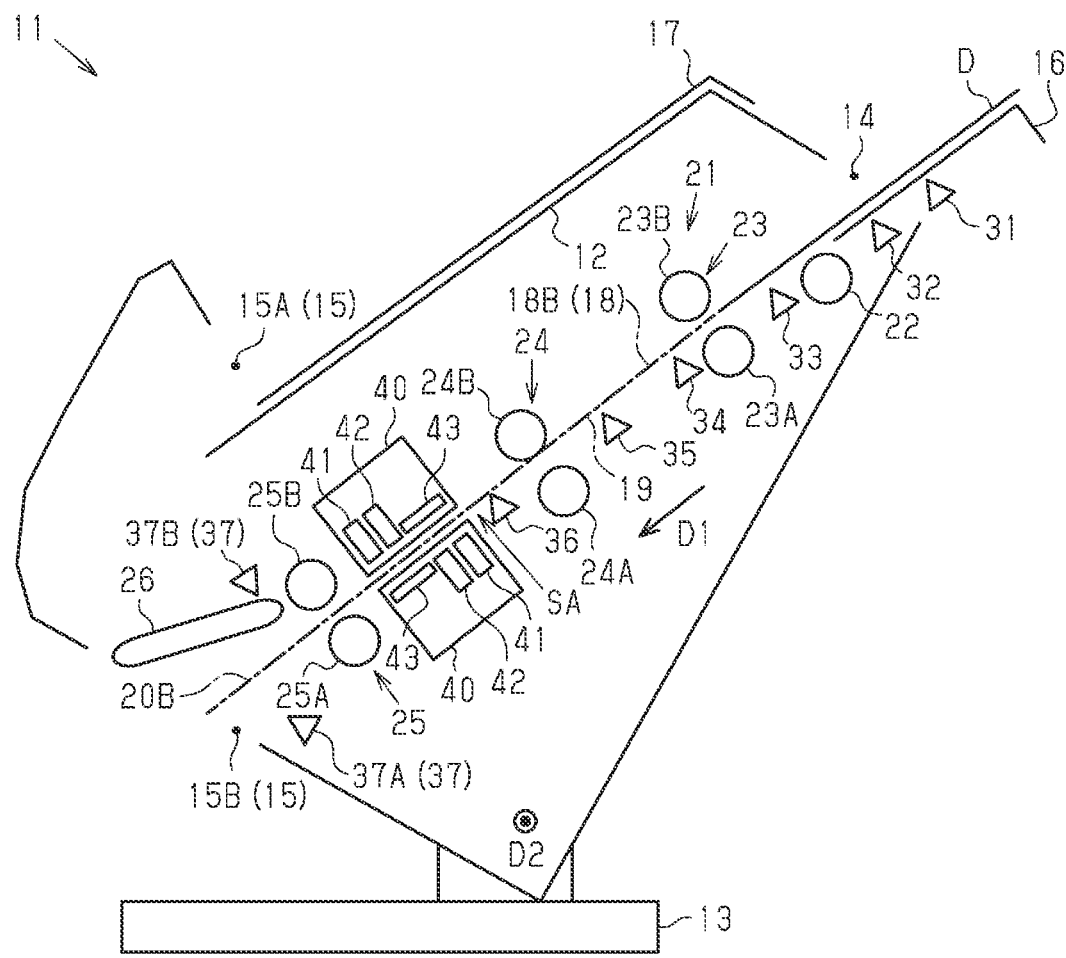
FIG. 2 is a side view of the image reading device in a second posture.

As shown in FIGS. 1 and 2, an image reading device 11 includes a housing 12 and a base 13. The housing 12 is supported by the base 13. The base 13 is installed, for example, on a horizontal plane. The housing 12 is configured to be rotatable with respect to the base 13.

The housing 12 is configured to be switchable in posture. The housing 12 is configured to switch its posture by, for example, rotating with respect to the base 13. The housing 12 is switched, for example, between the first posture shown in FIG. 1 and the second posture shown in FIG. 2. The housing 12 is configured such that the inclination of the housing 12 with respect to the base 13 changes between the first posture and the second posture. As described above, when the housing 12 is in the first posture, the image reading device 11 can reduce the foot space of the image reading device 11 as compared with the case where the housing 12 is in the second posture.

The housing 12 includes a supply port 14. The supply port 14 is an opening through which the document D before reading is fed. The housing 12 may include a plurality of discharge ports 15. The plurality of discharge ports 15 are openings through which the document D after reading is discharged. The plurality of discharge ports 15 includes a first discharge port 15A and a second discharge port 15B.

The image reading device 11 includes a paper feed tray 16. The paper feed tray 16 extends from the inside of the housing 12 to the outside of the housing 12 through the supply port 14. The document D before reading can be placed on the paper feed tray 16. The paper feed tray 16 is slidable in a direction in which the document D before reading is fed.

The image reading device 11 includes a paper discharge tray 17. The paper discharge tray 17 extends from the inside of the housing 12 toward the outside of the housing 12 through the first discharge port 15A. The document D after reading can be placed on the paper discharge tray 17. The paper discharge tray 17 is slidable in a direction in which the read document D is discharged.

The image reading device 11 includes a transporting path 18. The transporting path 18 is a path along which the document D is transported. The transporting path 18 extends inside the housing 12. The image reading device 11 includes, for example, a first transporting path 18A and a second transporting path 18B. The first transporting path 18A is a path indicated by one-dot chain line in FIG. 1. The second transporting path 18B is a path indicated by a one-dot chain line in FIG. 2.

As shown in FIG. 1, the first transporting path 18A extends from the supply port 14 toward the first discharge port 15A. The first transporting path 18A includes, for example, a common transporting path 19. The common transporting path 19 is a path common to the first transporting path 18A and the second transporting path 18B. The common transporting path 19 extends linearly or in a straight line shape. The direction in which the common transporting path 19 extends is the sub-scanning direction D1. The common transporting path 19 is a path passing through a reading area SA. The first transporting path 18A includes a curved path 20A. The curved path 20A extends from the common transporting path 19. The curved path 20A is curved in a U-shape, for example. The first transporting path 18A is, for example, a path along which the document D is transported when the housing 12 is in the first posture.

As shown in FIG. 2, the second transporting path 18B extends from the supply port 14 toward the second discharge port 15B. The second transporting path 18B includes, for example, the common transporting path 19. The second transporting path 18B includes a linear path 20B. The linear path 20B extends from the common transporting path 19. The linear path 20B is a path that is linear or extends in a straight line. The second transporting path 18B is, for example, a path along which the document D is transported when the housing 12 is in the second posture. As described above, the image reading device 11 is configured such that the path for transporting the document D is switched by switching the posture of the housing 12.

As described above, the image reading device 11 is configured such that the angle of the common transporting path 19 with respect to the horizontal plane is changed by switching the posture of the housing 12. In particular, the image reading device 11 may be configured such that the angle of the common transporting path 19 with respect to the horizontal plane is gentler when the housing 12 is in the second posture than when the housing 12 is in the first posture.

The image reading device 11 includes a transporting section 21. The transporting section 21 is configured to transport the document D in the sub-scanning direction D1. In particular, the transporting section 21 can transport a thin paper document D. The transporting section 21 can transport a thick paper document D. The transporting section 21 can transport a carrier sheet sandwiching the document D.

The transporting section 21 includes one or more rollers. The transporting section 21 includes, for example, a sheet feeding roller 22, a first roller pair 23, a second roller pair 24, and a third roller pair 25. The sheet feeding roller 22 is provided at an upstream end of the transporting path 18. The sheet feeding roller 22 feeds the document D placed on the paper feed tray 16 one sheet at a time into the housing 12 through the supply port 14.

A first roller pair 23 is provided downstream of the sheet feeding roller 22 in the transporting path 18. The first roller pair 23 includes a first drive roller 23A and a first separation roller 23B. The friction coefficient of the outer peripheral surface of the first separation roller 23B with respect to the document D is larger than that of the first drive roller 23A. The first separation roller 23B rotates at a rotation speed slightly lower than that of the first drive roller 23A. As a result, even when plural sheets of document D are fed from the sheet feeding roller 22 in an multifeed manner, the first roller pair 23 separates the lowermost sheet of the document D and transports the sheet downstream in the transporting path 18.

The second roller pair 24 is provided downstream of the first roller pair 23 in the transporting path 18. The second roller pair 24 is provided upstream of the reading area SA in the transporting path 18. The second roller pair 24 includes a second drive roller 24A and a second driven roller 24B. The second drive roller 24A is rotationally driven so as to transport the document D at a predetermined transporting speed. The second driven roller 24B is rotated by the rotation of the second drive roller 24A.

The third roller pair 25 is provided downstream of the second roller pair 24 in the transporting path 18. The third roller pair 25 is provided downstream of the reading area SA in the transporting path 18. The third roller pair 25 includes a third driving roller 25A and a third driven roller 25B. The third driving roller 25A is rotationally driven so as to transport the document D at a predetermined transporting speed. The third driven roller 25B is rotated by the rotation of the third driving roller 25A.

The transporting section 21 includes a path switching member 26. The path switching member 26 is, for example, a flap. The path switching member 26 switches the path along which the document D is transported to the first transporting path 18A or the second transporting path 18B. The path switching member 26 switches the path through which the document D is transported by closing the first transporting path 18A or the second transporting path 18B. When the path switching member 26 closes the first transporting path 18A, the path switching member 26 guides the document D to the second transporting path 18B. When the path switching member 26 closes the second transporting path 18B, the path switching member 26 guides the document D to the first transporting path 18A.

The path switching member 26 is interlocked with the posture of the housing 12, for example. The path switching member 26 closes the second transporting path 18B when the housing 12 is in the first posture. The path switching member 26 closes the first transporting path 18A when the housing 12 is in the second posture. The path switching member 26 may be displaced regardless of the posture of the housing 12. That is, the path may be switched by the path switching member 26 regardless of the posture of the housing 12.

The image reading device 11 includes one or more sensors that perform detection related to the reading of an image. Specifically, the image reading device 11 may include a first document sensor 31. The first document sensor 31 detects the presence or absence of the document D in the paper feed tray 16. The first document sensor 31 may be, for example, a contact sensor having a lever, or may be a non-contact sensor such as an optical sensor.

The image reading device 11 may include a document protection sensor 32. The document protection sensor 32 detects the position of the document D in the paper feed tray 16. In particular, in order to protect the document D, the document protection sensor 32 detects that the document D fed to the supply port 14 is transported in an inclined manner. The document protection sensor 32 may be, for example, a non-contact sensor such as an optical sensor or may be a contact sensor having a lever.

The image reading device 11 may include a document thickness sensor 33. The document thickness sensor 33 detects the thickness of the document D placed on the paper feed tray 16. For example, the document thickness sensor 33 may be capable of detecting any one of a thin paper document D, a thick paper document D, and a carrier sheet as the type of the document. The document thickness sensor 33 is located, for example, in the housing 12. The document thickness sensor 33 may be, for example, an ultrasonic sensor or an optical sensor.

The image reading device 11 may include a carrier sheet sensor 34. The carrier sheet sensor 34 is provided between the first drive roller 23A and the second drive roller 24A. The carrier sheet sensor 34 detects a carrier sheet between which the document D is sandwiched. The carrier sheet is a sheet configured to sandwich the document D with a transparent film. The carrier sheet can be transported through the transporting path 18 in a state in which a document D, for example, a document D having an extremely small size is interposed. The carrier sheet sensor 34 may be, for example, an optical sensor. The carrier sheet sensor 34 detects an identification portion such as a mark of the document D or the carrier sheet.

The image reading device 11 may include a multifeed sensor 35. The multifeed sensor 35 is provided between the first drive roller 23A and the second drive roller 24A. The multifeed sensor 35 is provided downstream of the carrier sheet sensor 34 in the transporting path 18. The multifeed sensor 35 detects a multifeed of the document D. Multifeed of a document D means that plural sheets of a document D are transported in an overlapped state.

The image reading device 11 may include a second document sensor 36. The second document sensor 36 is provided downstream of the second roller pair 24 in the transporting path 18. The second document sensor 36 detects the presence or absence of the document D transported by the second roller pair 24. The second document sensor 36 may be, for example, a contact sensor having a lever, or may be a non-contact sensor such as an optical sensor.

The image reading device 11 may include a posture sensor 37. The posture sensor 37 detects the posture of the housing 12. The posture sensor 37 may include a first posture sensor 37A and a second posture sensor 37B, or may be formed of one sensor. The first posture sensor 37A detects the first posture of the housing 12. The first posture sensor 37A may be configured to detect the path switching member 26 that closes the second transporting path 18B, for example. The second posture sensor 37B detects the second posture of the housing 12. The second posture sensor 37B is configured to detect, for example, the path switching member 26 that closes the first transporting path 18A.

The posture sensor 37 is not limited to a sensor that detects the path switching member 26, and may be, for example, a gyro sensor. When the posture sensor 37 is a gyro sensor, the image reading device 11 may be separately provided with a sensor for detecting the position of the path switching member 26.

The image reading device 11 includes one or more reading sections 40. The reading section 40 is configured to be able to read an image from a document D. The reading section 40 reads the image from the document D transported along the common transporting path 19 in the reading area SA. The reading section 40 is housed in the housing 12.

The image reading device 11 includes, for example, two reading sections 40. The two reading sections 40 are positioned so as to sandwich the common transporting path 19. The two reading sections 40 face each other. The two reading sections 40 each read a different surface of the document D. One of the two reading sections 40 reads the front surface of the document D. The other of the two reading sections 40 reads the back side of the document D. Thus, the image reading device 11 reads one side of the document D or both sides of the document D.

The reading section 40 includes a light source 41, an image sensor 42, and a background plate 43. The light source 41 is, for example, an LED or a fluorescent lamp. The light source 41 emits light toward the opposed background plate 43.

The image sensor 42 is arranged in the main scanning direction D2. The image sensor 42 is in the form of a module. The image sensor 42 is, for example, a contact type image sensor. Specifically, the image sensor 42 is a CMOS image sensor. The image sensor 42 photoelectrically converts the received light. The image sensor 42 outputs an output signal having a value corresponding to the amount of light received.

The image sensor 42 may be a monochrome sensor or a color sensor. The reading section 40 may be configured to read the document D in full color. For example, the reading section 40 may be configured to read the document D in the three colors of RGB. The reading section 40 may be configured to read the document D in grayscale.

The background plate 43 faces, for example, the light source 41 and the image sensor 42 of another reading section 40. The background plate 43 reflects light emitted from the light source 41 and causes the light to be incident on the image sensor 42. The background plate 43 is read together with the document D by the image sensor 42. The background plate 43 is read as a background together with the document D by the image sensor 42. The color of the background plate 43 is not limited to white, but may be gray, for example.

Electrical Configuration of Image Reading Device 11

Next, the electrical configuration of the image reading device 11 will be described with reference to FIG. 3.

Figure 3:
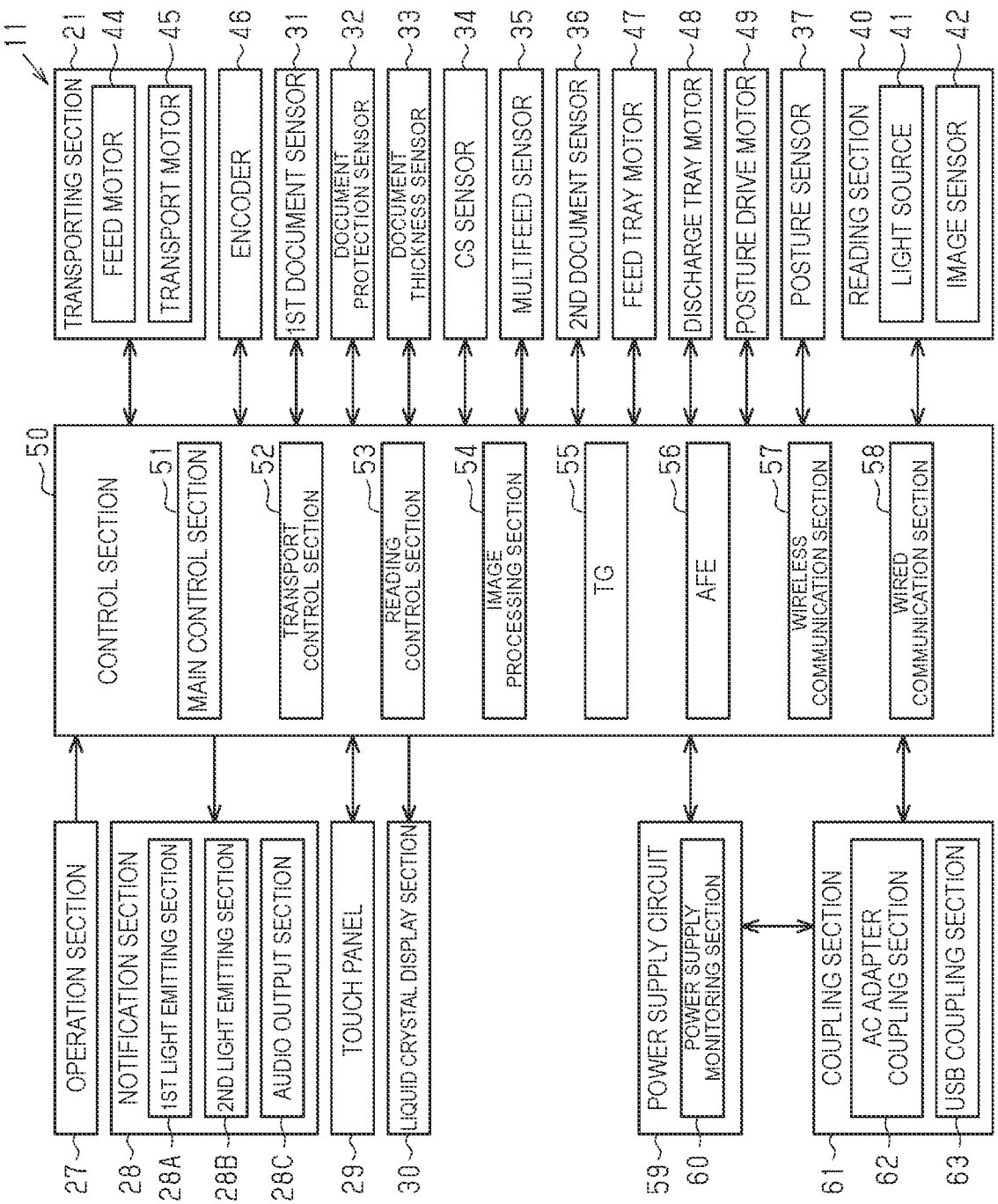
FIG. 3 is a block diagram showing electrical configuration of the image reading device.

As shown in FIG. 3, the image reading device 11 includes a control section 50. The control section 50 may perform overall control of the image reading device 11 and control various operations executed by the image reading device 11. In other words, the control section 50 is configured to perform control related to image reading. The control section 50 may include one or more processors that execute various processes in accordance with a program, one or more dedicated hardware circuits such as an application specific integrated circuit, or the like, that executes at least some of the various processes, or a combination of these. The processor includes a CPU and memory, such as RAM and ROM, which stores program code or instructions configured to cause the CPU to perform processes. The memory, that is, the computer-readable medium, includes any readable medium that can be accessed by a general purpose or special purpose computer. The control section 50 may include a System On a Chip (SOC).

The image reading device 11 includes an operation section 27. The operation section 27 is provided in the housing 12. The operation section 27 includes a plurality of switches that can be operated by the user. The plurality of switches include a power switch, a start switch, and a stop switch.

The image reading device 11 includes a notification section 28. The notification section 28 is provided in the housing 12. The notification section 28 is configured to perform notification related to image reading. In particular, the notification section 28 may be provided with, for example, a power source light emitting section (not shown). The power source light emitting section may be a light-emitting unit that notifies whether or not the power source is turned on.

The notification section 28 may include a first light emitting section 28A. In other words, the image reading device 11 may include the first light emitting section 28A. The first light emitting section 28A may be, for example, a display section such as an LED. The first light emitting section 28A may be a light emitting portion that notifies a type of mode (to be described later). That is, the first light emitting section 28A is configured to emit light in a light emitting mode in which the controlled mode can be identified.

The notification section 28 may include a second light emitting section 28B. In other words, the image reading device 11 may include the second light emitting section 28B. The second light emitting section 28B may be, for example, a display section such as an LED. The second light emitting section 28B may be a light emitting section that notifies a communication status of wireless communication. That is, the second light emitting section 28B is configured to emit light in a light emitting mode that enables identifying the state of wireless communication.

The notification section 28 may include an audio output section 28C. In other words, the image reading device 11 may include the audio output section 28C. The audio output section 28C is capable of outputting audio related to image reading. The audio output section 28C may be a speaker.

The image reading device 11 includes a touch panel 29 and a liquid crystal display section 30. The touch panel 29 is provided in the housing 12. The touch panel 29 is provided with a contact area which can be operated by a user. The liquid crystal display section 30 may be a display portion made of, for example, a liquid crystal panel. The liquid crystal display section 30 is configured to display an image at a position corresponding to the contact area of the touch panel 29. The liquid crystal display section 30 displays information related to image reading, such as setting information. The liquid crystal display section 30 can display more detailed information than the notification section 28.

In the present embodiment, the first light emitting section 28A, the second light emitting section 28B, and the liquid crystal display section 30 correspond to an example of a display section. The display section can display information. Further, information is erasable from the display section. The first light emitting section 28A, the second light emitting section 28B, the audio output section 28C, and the liquid crystal display section 30 correspond to an example of a notification section. The notification section can notify information.

The transporting section 21 includes a feed motor 44 and a transport motor 45. The feed motor 44 is a power source for rotationally driving the sheet feeding roller 22 and the first drive roller 23A. The transport motor 45 is a power source for rotationally driving the first separation roller 23B, the second drive roller 24A, and the third driving roller 25A.

The image reading device 11 may include an encoder 46. The encoder 46 is provided inside the housing 12. The encoder 46 may be, for example, a rotary encoder. The encoder 46 may be capable of detecting the rotation of the second drive roller 24A, but may be capable of detecting the rotation of another roller. The encoder 46 outputs a detection signal including the number of pulses proportional to the rotation amount of the second drive roller 24A.

The image reading device 11 includes a paper feed tray motor 47. The paper feed tray motor 47 is a drive source capable of moving the paper feed tray 16. The image reading device 11 includes a discharge tray motor 48. The discharge tray motor 48 is a driving source capable of moving the paper discharge tray 17. The image reading device 11 includes a posture drive motor 49. The posture drive motor 49 is a power source that drives the housing 12 such that the posture of the housing 12 can be changed.

The control section 50 is coupled to the operation section 27, the notification section 28, the touch panel 29, and the liquid crystal display section 30. The control section 50 can input an operation signal from the operation section 27. The control section 50 can output a notification signal to the notification section 28. The control section 50 can input a contact signal from the touch panel 29. The control section 50 can control whether to enable or disable the touch panel 29. The control section 50 can output a signal for displaying an image to the liquid crystal display section 30. The control section 50 can control whether to enable or disable the liquid crystal display section 30.

The control section 50 is coupled to the first document sensor 31, the document protection sensor 32, the document thickness sensor 33, the carrier sheet sensor 34, the multi-feed sensor 35, the second document sensor 36, the posture sensor 37, and the encoder 46. In FIG. 3, the carrier sheet sensor 34 is referred to as a CS sensor. The control section 50 is capable of receiving input detection signals from the first document sensor 31, the document protection sensor 32, the document thickness sensor 33, the carrier sheet sensor 34, the multifeed sensor 35, the second document sensor 36, the posture sensor 37, and the encoder 46. The control section 50 can control whether to enable or disable the first document sensor 31, the document protection sensor 32, the document thickness sensor 33, the carrier sheet sensor 34, the multifeed sensor 35, the second document sensor 36, the posture sensor 37, and the encoder 46.

The control section 50 is coupled to the feed motor 44, the transport motor 45, the paper feed tray motor 47, the discharge tray motor 48, and the posture drive motor 49. The control section 50 can output signals for driving the feed motor 44, the transport motor 45, the paper feed tray motor 47, the discharge tray motor 48, and the posture drive motor 49. The feed motor 44 may be constituted by, for example, one motor, or may be constituted by, for example, a plurality of motors. The transport motor 45 may be constituted by, for example, one motor, or may be constituted by, for example, a plurality of motors. The paper feed tray motor 47 may be constituted by, for example, one motor, or may be constituted by, for example, a plurality of motors. The discharge tray motor 48 may be constituted by, for example, one motor, or may be constituted by, for example, a plurality of motors. The posture drive motor 49 may be constituted by, for example, one motor, or may be constituted by, for example, a plurality of motors.

The control section 50 includes a timing generator 55. In FIG. 3, the timing generator 55 is denoted by TG. The timing generator 55 outputs a pulse signal indicating the reading operation timing to the reading section 40.

The control section 50 includes an analog front end 56. In FIG. 3, the analog front end 56 is denoted by AFE. The analog front end 56 converts the image signal from the image sensor 42 from an analog signal to a digital signal.

The control section 50 is coupled to the reading section 40. The control section 50 can instruct the reading section 40 to read an image via the timing generator 55. The control section 50 can input an image signal from the reading section 40 via the analog front end 56. The control section 50 can adjust a reading control clock supplied to the timing generator 55 and the analog front end 56. The timing generator 55 and the analog front end 56 are driven at a cycle based on a reading control clock supplied from the control section 50.

The control section 50 includes various functional sections that function by executing programs. More specifically, the control section 50 includes a main control section 51, a transport control section 52, a reading control section 53, an image processing section 54, a wireless communication section 57, and a wired communication section 58. The main control section 51 integrally controls the image reading device 11.

The transport control section 52 controls to transport the document D along the transporting path 18. The transport control section 52 controls driving of the feed motor 44 and the transport motor 45 in accordance with an instruction from the main control section 51. In particular, the transport control section 52 controls drive of the feed motor 44 and the transport motor 45 such that the document D is transported at a transport speed corresponding to the reading speed. In the present embodiment, paper per minute (ppm), which is the number of sheets of the document D of the reference size that can be read per minute, is used as the unit of the reading speed. The reading speed may be designated based on the reading command, or may be set in advance in the control section 50 instead of for each reading command.

As a specific example, when the reading speed is 90 ppm, the transport control section 52 transports the document D at a higher speed than when the reading speed is 20 ppm. When the reading speed is 20 ppm, the transport control section 52 transports the document D at a higher speed than when the reading speed is 5 ppm.

The reading control section 53 controls the reading section 40 via the timing generator 55. In particular, the reading control section 53 controls light emission of the light source 41. The reading control section 53 controls the image sensor 42 to perform a reading operation. Thus, the reading control section 53 controls the reading section 40 to read the image of the document D.

Further, the reading control section 53 causes the reading section 40 to read an image at any one of 90 ppm, 20 ppm, and 5 ppm as the reading speed. That is, the reading section 40 can read an image at any one of a plurality of reading speeds including 90 ppm, 20 ppm, and 5 ppm. As a reading speed, 5 ppm is slower than 20 ppm, and 20 ppm is slower than 90 ppm. The reading speed 90 ppm corresponds to an example of a first reading speed. The reading speed of 20 ppm corresponds to an example of a second reading speed. The reading speed of 5 ppm corresponds to an example of a third reading speed.

The image processing section 54 processes image data of an image read by the reading section 40. In particular, the image processing section 54 can perform a predetermined correction on the image data of the image read by the reading section 40.

The image processing section 54 can output the corrected image data to an external device. Examples of the external device include a Universal Serial Bus (USB) memory, a personal computer, a mobile terminal device, and a server device. The communication with the external device may be wired communication or wireless communication. The wired communication includes USB communication via a USB cable, but may also include communication via another communication cable such as a Local Area Network (LAN) cable.

The wireless communication section 57 controls for performing wireless communication. Wireless communication may be, for example, wireless communication capable of interconnecting USB devices using the IEEE802.11 standard. In other words, the wireless communication may be, for example, Wi-Fi®. The wireless communication may be, for example, Bluetooth®.

The wired communication section 58 controls for performing wire communication. The wired communication may be, for example, communication via a USB cable or may include communication via another communication cable such as a LAN cable. The wired communication is communication that consumes less power than the wireless communication.

When a reading command is input, the image reading device 11 can perform a reading operation of conveying one or more sheets of the document D placed on the paper feed tray 16 one sheet at a time and reading an image from the documents D. That is, the image reading device 11 can perform a reading operation of reading an image from one or a plurality of sheets of document D based on one reading command. The reading command may be an instruction from the operation section 27, an instruction from the touch panel 29, or an instruction from a personal computer or a portable terminal device.

The image reading device 11 includes a power supply circuit 59. The power supply circuit 59 supplies power to various members of the image reading device 11 based on power supplied through a coupling section 61 (to be described later). The power supply circuit 59 includes a power supply monitoring section 60. The power supply monitoring section 60 is configured to monitor a power supply voltage supplied to the power supply circuit 59.

The image reading device 11 includes the coupling section 61. The coupling section 61 can be coupled to a power supply source from the outside of the image reading device 11. The control section 50 is coupled to the power supply circuit 59 and the coupling section 61. The power supply circuit 59 is coupled to the coupling section 61.

The coupling section 61 includes an AC adapter coupling section 62. The AC adapter coupling section 62 is couplable with an AC adapter cable. That is, the AC adapter coupling section 62 can be coupled to an AC adapter as a power supply source via an AC adapter cable. It can also be said that the AC adapter coupling section 62 can be coupled to a commercial power supply as a power supply source via an AC adapter cable and an AC adapter.

The coupling section 61 includes a USB coupling section 63. That is, the image reading device 11 includes the USB coupling section 63. A USB cable can couple to the USB coupling section 63. That is, the USB coupling section 63 can be coupled to a USB device as a power supply source via a USB cable. The USB device includes, for example, a USB memory, a personal computer, and a portable terminal device. In the present embodiment, the operation section 27, the touch panel 29, the wireless communication section 57, and the wired communication section 58 correspond to an example of an input section. The input section can input an instruction by a user.

Positional Relationship Between USB Coupling Section 63 and Light Emitting Portion Here, a positional relationship among the USB coupling section 63, the first light emitting section 28A, and the second light emitting section 28B will be described with reference to FIG. 4.

Figure 4:
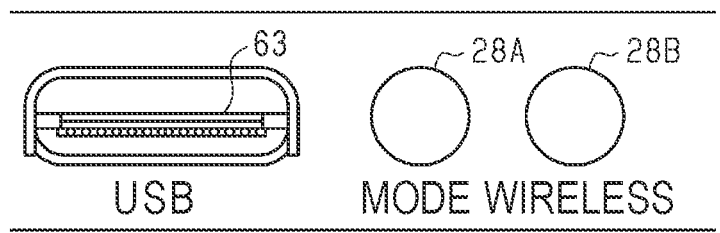
FIG. 4 is a schematic view showing a USB coupling section, a first light emitting section, and a second light emitting section.

As shown in FIG. 4, the USB coupling section 63, the first light emitting section 28A, and the second light emitting section 28B are configured to be exposed on the same surface. Therefore, the USB coupling section 63 and the first light emitting section 28A are provided so as to be visible from a predetermined direction. The USB coupling section 63 and the second light emitting section 28B are provided so as to be visual checkable from a predetermined direction. Thus, when the USB cable is coupled to the USB coupling section 63, it is possible to provide a situation in which the first light emitting section 28A and the second light emitting section 28B are easily visually checked.

Power Supply Monitoring Section 60

Next, an electrical configuration of the power supply monitoring section 60 will be described with reference to FIG. 5.

Figure 5:
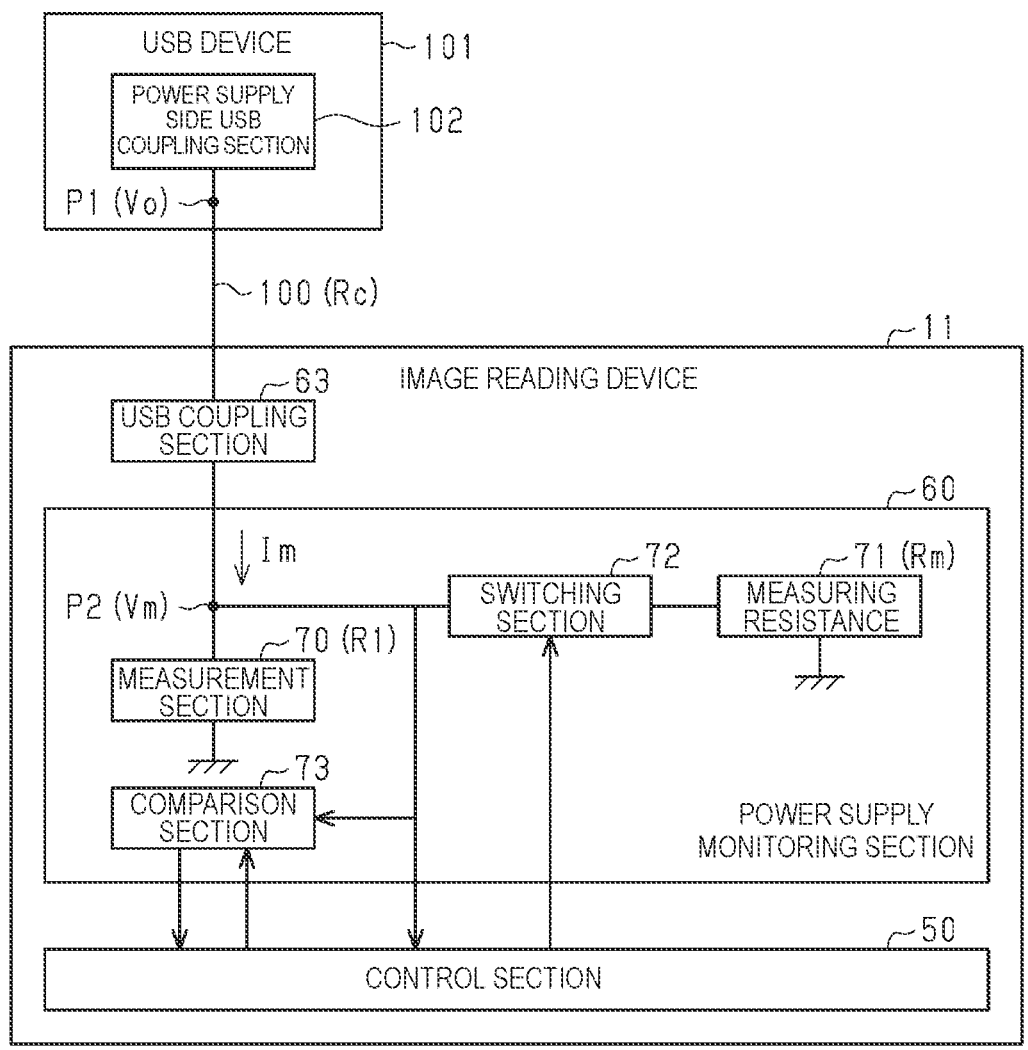
FIG. 5 is a block diagram showing an electrical configuration of a power supply monitoring section.

As shown in FIG. 5, the power supply monitoring section 60 is coupled to the USB coupling section 63. In particular, the power supply monitoring section 60 is coupled to a power supply terminal of the USB coupling section 63. A USB cable 100 can be coupled to the USB coupling section 63.

A USB device 101 includes a power supply side USB coupling section 102. The USB cable 100 can be coupled to the power supply side USB coupling section 102. A first position P1 is a position of output from the power supply side USB coupling section 102 to outside. The first position P1 is a terminal portion for outputting the supply voltage Vo from the USB device 101. That is, the first position P1 is an output terminal portion of the USB power supply in the USB device 101. The USB cable 100 has a resistance value Rc.

The power supply monitoring section 60 includes a measurement section 70. The measurement section 70 is configured to measure the voltage Vm at a second position P2. The second position P2 is a position coupled to the USB coupling section 63. The second position P2 is the terminal portion to which the power supply voltage supplied from the USB device 101 is input. That is, the second position P2 is an input terminal portion of the USB power supply in the image reading device 11. In this manner, the measurement section 70 can measure the voltage Vm supplied from the USB cable 100 coupled to the USB coupling section 63 in a state where the USB cable 100 is coupled to the USB coupling section 63.

The measurement section 70 is coupled to the control section 50. The measurement section 70 outputs a signal indicating the voltage to the control section 50. The measurement section 70 is coupled to a comparison section 73 (to be described later). The measurement section 70 also outputs a signal indicating the voltage to the comparison section 73.

The power supply monitoring section 60 includes a measuring resistance 71. That is, the image reading device 11 includes the measuring resistance 71. The measuring resistance 71 is used when the voltage Vm is measured by the measurement section 70. The measuring resistance 71 has a resistance Rm.

The power supply monitoring section 60 includes a switching section 72. That is, the image reading device 11 includes the switching section 72. The switching section 72 is coupled between the second position P2 and the measuring resistance 71. The switching section 72 is coupled to the control section 50. The switching section 72 is configured to switch the connection state between the second position P2 and the measuring resistance 71 based on a signal from the control section 50. The connection state includes a first state and a second state. The first state is a state in which the second position P2 and the measuring resistance 71 are connected. That is, the first state is a state in which the measurement section 70 and the measuring resistance 71 are coupled to each other. The second state is a state in which the second position P2 and the measuring resistance 71 are not coupled. That is, the second state is a state in which the measurement section 70 and the measuring resistance 71 are not coupled to each other. In this way, the switching section 72 can at least switch between the first state and the second state.

The control section 50 can switch between the first state and the second state by outputting a signal to the switching section 72. That is, the control section 50 can control the switching section 72 so as to switch between the first state and the second state. In the second state, the measuring resistance 71 is not coupled to the measurement section 70, and the control section 50 and the measurement section 70 have the resistance R1. In FIG. 5, for the sake of convenience, only resistance R1 is indicted in the measurement section 70. In the first state, the measuring resistance 71 is coupled to the measurement section 70. Therefore, the control section 50 and the measurement section 70 are coupled in parallel with the measuring resistance 71. A resistance in a case where the control section 50 and the measurement section 70 are coupled in parallel to the measuring resistance 71 is set as a resistance Rs.

In this way, the control section 50 can acquire the first voltage Vm1 and the second voltage Vm2. The control section 50 can acquire a measurement result related to the power loss of the USB cable 100 based on the acquired first voltage Vm1 and second voltage Vm2.

The measurement result related to the power loss of the USB cable 100 may be a measurement value related to the power loss of the USB cable 100. The measured value related to the power loss of the USB cable 100 may be electric power lost by the USB cable 100, the voltage drop by the USB cable 100, or a resistance Rc. Hereinafter, the electric power lost by the USB cable 100 may be referred to as a power loss value. The voltage drop by the USB cable 100 may be referred to as a voltage drop.

Specifically, it is assumed that a current Im1 flows to the second position P2 in the first state, and a current Im2 flows to the second position P2 in the second state. In this case, in the first state, the supplied voltage Vo is a result obtained by multiplying the sum of the resistance Rc and the resistance Rs by the current Im1. In the first state, the first voltage Vm1 is a multiplication result of the resistance Rs and the current Im1. On the other hand, in the second state, the supplied voltage Vo is a result obtained by multiplying the sum of the resistance Rc and the resistance R1 by the current Im2. Further, in the second state, the second voltage Vm2 is a multiplication result of the resistance R1 and the current Im2. From such a relationship, the control section 50 can acquire the resistance Rc based on the acquired first voltage Vm1 and second voltage Vm2, the resistance R1, and the resistance Rm.

Further, the control section 50 can acquire the voltage drop and the power loss value based on the resistance Rc and the current Im at the second position P2. More specifically, the control section 50 acquires the result of multiplication of the resistance Rc and the current Im at the second position P2 as the voltage drop. The control section 50 acquires the multiplication result of the resistance Rc and the square of the current Im at the second position P2 as the power loss value. In addition, the control section 50 can acquire the measurement result regarding the electric power loss of the USB cable 100 regardless of the supply voltage Vo output from the USB device 101.

The power supply monitoring section 60 includes the comparison section 73. The comparison section 73 is configured to compare an input voltage with a reference voltage. The comparison section 73 is coupled to the control section 50. The control section 50 inputs a signal indicating the reference voltage to the comparison section 73. The comparison section 73 compares the voltage Vm measured by the measurement section 70 with a reference voltage. When the voltage value measured by the measurement section 70 exceeds the reference voltage value, the comparison section 73 outputs to the control section 50 a signal indicating that the voltage value exceeds the reference voltage value.

Control Related to Coupling Section 61

Here, control related to the coupling section 61 will be described.

The control section 50 monitors a connection state of the coupling section 61 with respect to the power supply circuit 59. More specifically, the control section 50 monitors whether or not the USB device is coupled to the power supply circuit 59. The control section 50 decides on one of the power supply sources coupled to the coupling section 61 based on the connection state of the coupling section 61 with respect to the power supply circuit 59.

The control section 50 directs the decided-on power supply source to the power supply circuit 59. The power supply circuit 59 supplies power to various members of the image reading device 11 based on the power from the power supply source directed by the control section 50. The control section 50 decides on the power supply source in accordance with the previously determined priority order for the coupling state. Specifically, the control section 50 decides on the power supply source by giving priority to the AC adapter over the USB device.

The control section 50 performs USB negotiation with a USB device coupled via the USB coupling section 63 and a USB cable. In particular, the control section 50 performs USB negotiation with the USB device when the power is turned on. The control section 50 performs USB negotiation with the USB device in response to a change in the connection state with the USB device. The control section 50 performs USB negotiation with a USB device in response to a user instruction. The USB negotiation is a process of deciding on a USB standard adopted between the image reading device 11 and a USB device. The control section 50 determines the connection state with the USB device based on the result of the USB negotiation, and controls in accordance with one of the USB standards.

The USB standard includes USB2.0, USB3.0, USB-BC (Battery Charging), USB-PD (Power Delivery), or the like. The USB standards have different communication speeds.

As for standard of the USB, a standard of a USB connector is different. As a standard of the USB connector, for example, there are Type-A, Type-B, Type-C, mini-USB, Micro USB, and the like. The USB coupling section 63 is preferably, but not limited to, Type-C when USB-PD is adopted.

The USB standards differ in terms of the power that can be supplied. That is, the power that can be supplied varies depending on the USB power supply standard. For example, the USB2.0 can supply power of 2.5 W (0.5 A/5V). The USB3.0 can supply power of 4.5 W (0.9 A/5V). The USB-BC can supply power of 7.5 W (1.5 A/5V). The USB-PD can supply power of 15 W or more. In particular, the USB-PD can supply power of 15 W (3 A/5V), but is not limited thereto. The USB-PD may be capable of supplying power of, for example, 27 W (3 A/9V), 45 W (3 A/15V), 60 W (5 A/12V or 3 A/20 V), or 100 W (5 A/20 V).

The power values that can be supplied can be classified into a low power range, a medium power range, and a high power range. The low power range may be a power range of 7.5 W or greater and less than 15 W. The medium power range may be a power range of 15 W or greater and less than 27 W. The high power range may be a power range of 27 W or more and less than 100 W. Hereinafter, a USB device capable of supplying power in a high power range may be referred to as a high USB device. A USB device capable of supplying power in a middle power range may be referred to as a middle USB device. A USB device capable of supplying power in a low power range may be referred to as a low USB device.

The control section 50 can control to any one of a plurality of types of modes. In particular, the control section 50 can control to any one of a plurality of types of modes based on the specified power supply source and the standard of the USB power supply. In other words, the control section 50 can control to any one of a plurality of types of modes based on the coupling state with the USB device.

The plurality of types of modes for the image reading device 11 are modes in which power consumptions are different. The plurality of types of modes may include a low-output mode, a middle-output mode, and a high-output mode. The middle-output mode is a mode in which power consumption is smaller than that in the high-output mode. The low-output mode is a mode in which power consumption is smaller than that in the middle-output mode.

The high-output mode is a mode that can be controlled when a high-power supply USB is the power supply source. The high-output mode may be a controllable mode when the AC adapter is the power supply source. The middle-output mode is a mode that can be controlled when the middle-power supply USB device is the power supply source. The low-output mode is a mode that can be controlled when the low power supply USB device is the power supply source. The high-output mode corresponds to an example of the first mode. The middle-output mode corresponds to an example of the second mode. The low-output mode corresponds to an example of the third mode.

Mode Control Content

Here, the control contents for each mode will be described with reference to FIG. 6.

As shown in FIG. 6, the control contents correspond to a plurality of types of modes. The control is performed according to control contents corresponding to a set mode among a plurality of types of modes. In FIG. 6, valid information is indicated by "0", and invalid information is indicated by "x".

Specifically, the control content corresponding to each of the plurality of types of modes includes the control content of the control section 50 and the reading speed. The control contents, corresponding to each of the plurality of types of modes, include document type, carrier sheet, multifeed detection, document protection, posture drive, and tray drive. The control contents, corresponding to each of the plurality of types of modes, include a communication method, a liquid crystal display, a touch panel, and a USB memory.

As for control content of the control section 50, the power consumption in the middle-output mode is lower than that in the high-output mode. As the control content of the control section 50, the power consumption in the low-output mode is lower than that in the middle-output mode.

In particular, the control contents of the control section 50 include adjustment of the operating frequency of the control section 50. As a specific example, the operating frequency of the control section 50 is set to be lower in the middle-output mode than in the high-output mode. The operating frequency of the control section 50 is set to be lower in the low-output mode than in the middle-output mode.

The control content of the control section 50 includes whether the functions of the control section 50 are enabled or disabled. In the middle-output mode, more functions of the control section 50 are set to be disabled than in the high-output mode. In the low-output mode, more functions of the control section 50 are set to be disabled than in the middle-output mode.

As for reading speed in the high-output mode, an image can be read at 90 ppm, 20 ppm, and 5 ppm. As for reading speed in the middle-output mode, an image cannot be read at 90 ppm, and images can be read at 20 ppm and 5 ppm. As for reading speed in the low-output mode, an image cannot be read at 90 ppm nor at 20 ppm, and an image can be read at 5 ppm. When the reading speed is low, the power consumption decreases.

As described above, when a reading command is input, the control section 50 causes the reading section 40 to read an image in 90 ppm in the case where the control section 50 is controlled to the high-output mode. When a reading command is input, the control section 50 causes the reading section 40 to read the image in the 20 ppm in a case where the control section 50 is controlled to the middle-output mode. When a reading command is input, the control section 50 causes the reading section 40 to read an image in 5 ppm in a case where the control section 50 is controlled to the low-output mode. That is, when a reading command is input, the control section 50 causes the reading section 40 to control corresponding to the decided-on mode of the plurality of mode types.

The document type includes a thin paper document D and a thick paper document D. The thick document D requires a larger transporting force by the transporting section 21 than the thin document D. For this reason, the thick document D has a larger control load by the transporting section 21 than the thin document D, and power consumption increases.

As for document type, in the high-output mode, an image can be read from both a thin paper document D and a thick paper document D. In the middle-output mode and the low-output mode, an image can be read from the thin paper document D, but an image is not read from the thick paper document D.

As for carrier sheet, transport of the carrier sheet and the carrier sheet sensor 34 are enabled in the high-output mode, and transport of the carrier sheet and the carrier sheet sensor 34 are disabled in the middle-output mode and the low-output mode. The carrier sheet requires a larger transporting force by the transporting section 21 than the thin document D. For this reason, the carrier sheet has a larger control load by the transporting section 21 than the thin document D, and power consumption increases. Since the carrier sheet sensor 34 is disabled, the power consumption is reduced.

As for multifeed detection, the multifeed sensor 35 is enabled in the high-output mode, and is disabled in the middle-output mode and the low-output mode.

As for document protection, the document protection sensor 32 is enabled in the high-output mode and the middle-output mode, and the document protection sensor 32 is disabled in the low-output mode. Since the document protection sensor 32 is disabled, the power consumption is reduced.

Posture drive is drive of the posture drive motor 49 for changing the posture of the housing 12. As for posture drive, drive of the posture drive motor 49 is enabled in the high-output mode and the middle-output mode, and drive of the posture drive motor 49 is disabled in the low-output mode. Since drive of the posture drive motor 49 is disabled, the power consumption is reduced.

Tray drive includes drive of the feed tray motor 47 and drive of the discharge tray motor 48. As for tray drive, tray drive is enabled in the high-output mode, and tray drive is disabled in the middle-output mode and the low-output mode. Since the tray drive is disabled, the power consumption is reduced.

Communication methods include wireless communication and wired communication. As for wireless communication, the output of the image data via the wireless communication is enabled in the high-output mode. As for wireless communication, the output of image data via wireless communication is disabled in the low-output mode. As for wireless communication, in the middle-output mode, the output of the image data via the wireless communication is disabled during a reading period of a reading control period based on a reading command. As for wireless communication, in the middle-output mode, the output of the image data via the wireless communication is effective during the non-reading control period and the non-reading period of the reading control period.

The reading control period indicates, in the case of reading the image from a plurality of sheets of a document D based on a single reading command, a period from the start of reading the image of the first sheet of the document D from the plural sheets of the document D to the end of reading images from the plural sheets of document D. The reading period is a period during which an image is actually read by the reading section 40 in the reading control period. The non-reading period is a period of the reading control period in which an image is not actually read by the reading section 40. When the wireless communication is disabled, power consumption is reduced. In particular, during reading of the image based on a reading command, wireless communication becomes invalid, thereby reducing power consumption.

As for wired communication, the output of the image data via wired communication is enabled in the high-output mode and the middle-output mode. As for wired communication, in the low-output mode, output of image data via wired communication is disabled during the reading period of the reading control period. As for wired communication, in the low-output mode, output of image data via wired communication is effective in the non-reading period of the reading control period and in the non-reading control period. When wired communication is disabled, power consumption is reduced.

As for the liquid crystal display, the liquid crystal display section 30 is enabled in the high-output mode and the middle-output mode, and the liquid crystal display section 30 is disabled in the low-output mode. When the liquid crystal display section 30 is disabled, power consumption is reduced.

The control section 50 controls the liquid crystal display section 30 to be valid in the high-output mode and the middle-output mode. Thus, the control section 50 can cause the liquid crystal display section 30 to display an image in the high-output mode and the middle-output mode. The control section 50 controls the liquid crystal display section 30 to be disabled in the low-output mode.

As for the touch panel, the touch panel 29 is enabled in the high-output mode and the middle-output mode, and is disabled in the low-output mode. When the touch panel 29 is disabled, power consumption is reduced.

The USB memory indicates whether to enable or disable storage of image data in the USB memory when the USB memory is coupled via the USB coupling section 63. As for the USB memory, the storage of the image data in the USB memory is enabled in the high-output mode, and the storage of the image data in the USB memory is disabled in the middle-output mode and the low-output mode. Since the storage of the image data in the USB memory is disabled, power consumption is reduced.

Mode Setting Process

Here, the mode setting process will be described with reference to FIG. 7. The mode setting process is a process that is called each predetermined period of time. In order to facilitate understanding of the present disclosure, it is assumed that the AC adapter cable is not coupled to the AC adapter coupling section 62 in each of the following processes. In addition, the order of the subsequent processes can be arbitrarily changed without departing from the purpose of each process.

Figure 7:
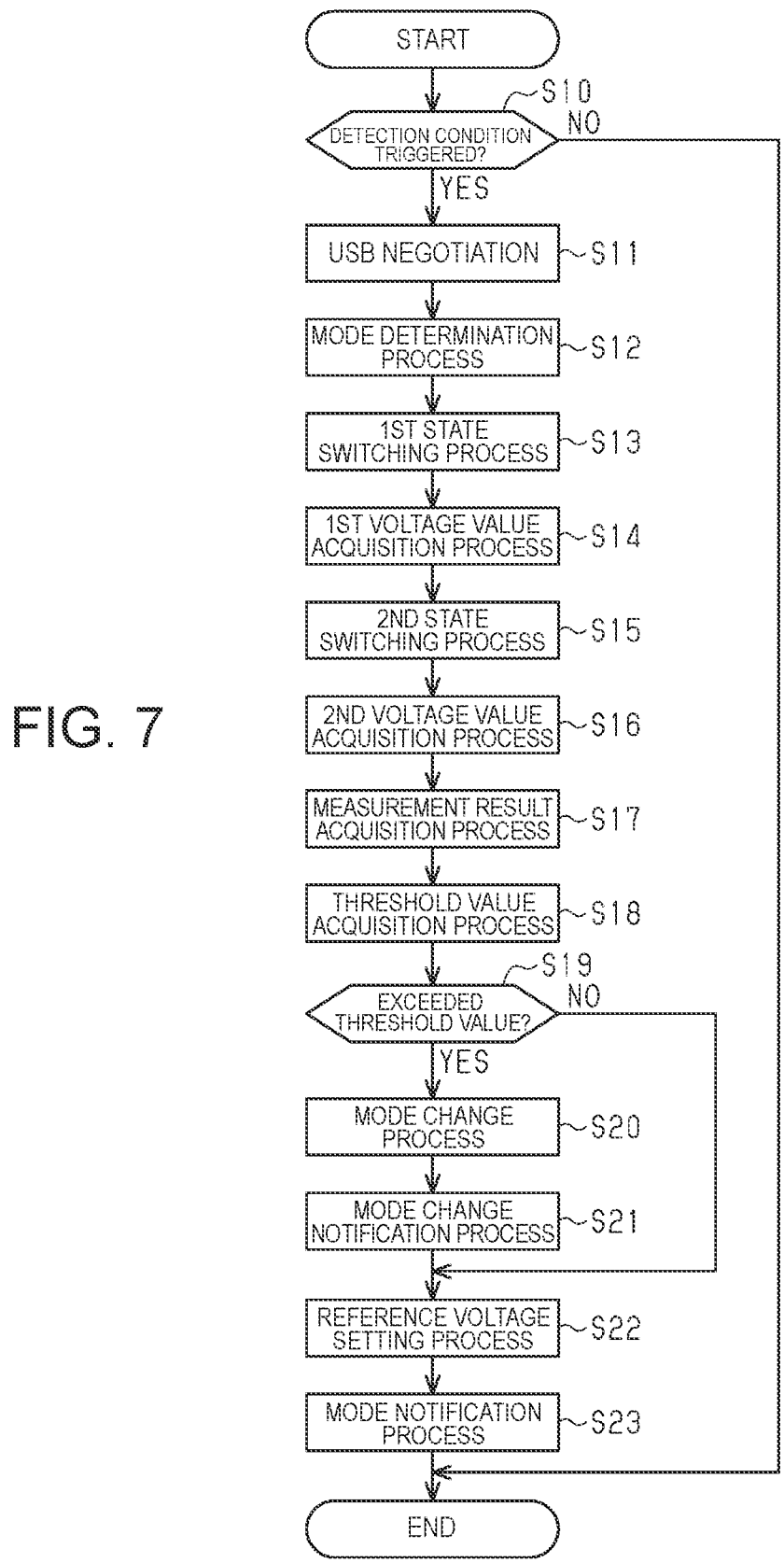
FIG. 7 is a flowchart showing a mode setting process.

As shown in FIG. 7, in step S10, the control section 50 determines whether or not the detection condition is satisfied. The detection conditions may include a first detection condition, a second detection condition, and a third detection condition. The first detection condition is triggered by power-on. The second detection condition is triggered by user instructions. The third detection condition is triggered when the connection state with the USB device is changed. To give a specific example, the third detection condition is triggered when the state in which the USB device is not coupled to the USB coupling section 63 via the USB cable is changed to the state in which the USB device is coupled to the USB coupling section 63 via the USB cable. When it is determined that the detection condition is not satisfied, the control section 50 ends the mode setting process. On the other hand, when it is determined that the detection condition is satisfied, the control section 50 shifts the process to step S11.

In step S11, the control section 50 performs USB negotiation with the USB device. That is, the control section 50 can execute USB negotiation in a state where the USB cable is coupled to the USB coupling section 63. Then, the control section 50 determines the connection state with the USB device based on the result of the USB negotiation. By this, the control section 50 identifies the standard of the USB. In particular, the control section 50 identifies a power and a current corresponding to the USB power supply standard. When this process is completed, the control section 50 shifts the process to step S12.

In step S12, the control section 50 executes a mode determination process. In this process, the control section 50 decides on one of a plurality of types of modes based on the result of the USB negotiation. Specifically, the control section 50 decides on the high-output mode when the high-power supply USB device is coupled. The control section 50 decides on the middle-output mode when the middle-power supply USB device is coupled. The control section 50 decides on a low-output mode when a low-power supply USB device is coupled.

As described above, when the power is turned on, then the first detection condition is satisfied, and the control section 50 decides on one of the plurality of types of modes based on the result of the USB negotiation. When an instruction is input by the user after the power is turned on, then the second detection condition is satisfied, and the control section 50 decides on one of the plurality of types of modes based on the result of the USB negotiation. After the power is turned on, when a state where the USB cable is not coupled to the USB coupling section 63 is changed to a state where the USB cable is coupled to the USB coupling section 63, then the third detection condition is satisfied, and the control section 50 decides on one of the plurality of types of modes based on the result of the USB negotiation. When this process is completed, the control section 50 shifts the process to step S13.

In step S13, the control section 50 executes a first state switching process. In this process, the control section 50 outputs a signal, for controlling to the first state, to the switching section 72. When this process is completed, the control section 50 shifts the process to step S14.

In step S14, the control section 50 executes a first voltage value acquisition process. In this process, the control section 50 acquires the first voltage Vm1 at the time of being controlled to the first state from the measurement section 70. Then, the control section 50 stores the first voltage Vm1 in the memory. When this process is completed, the control section 50 shifts the process to step S15.

In step S15, the control section 50 executes a second state switching process. In this process, the control section 50 outputs a signal, for controlling to the second state, to the switching section 72. When this process is completed, the control section 50 shifts the process to step S16.

In step S16, the control section 50 executes a second voltage value acquisition process. In this process, the control section 50 acquires the second voltage Vm2 at the time of being controlled to the second state from the measurement section 70. Then, the control section 50 stores the second voltage Vm2 in the memory. When this process is completed, the control section 50 shifts the process to step S17.

In step S17, the control section 50 executes a measurement result acquisition process. In this process, the control section 50 can acquire the power loss value as a measurement result based on the first voltage Vm1 and the second voltage Vm2. In particular, the control section 50 calculates the resistance Rc based on the resistance R1, the resistance Rm, the first voltage Vm1, and the second voltage Vm2. Then, the control section 50 calculates a power loss value based on the resistance Rc and the current Im at the second position P2. The control section 50 acquires the current corresponding to the standard of the USB power supply as the current Im of the second position P2, but is not limited thereto. The image reading device 11 may include an ampere meter that measures the current Im at the second position P2, and the control section 50 may acquire the current Im at the second position P2 from the ampere meter. When this process is completed, the control section 50 shifts the process to step S18.

In this way, the control section 50 executes the measurement process in steps S13 to S17. The measurement process is a process for acquiring a measurement result related to the power loss by the USB cable coupled to the USB coupling section 63 based on the first voltage Vm1 and the second voltage Vm2.

Specifically, when the power is turned on in a state where the USB cable is coupled to the USB coupling section 63, the first detection condition is satisfied, and the control section 50 executes the measurement process. When an instruction is input by the user after the power is turned on, the second detection condition is satisfied, and the control section 50 executes the measurement process. When a state where the USB cable is not coupled to the USB coupling section 63 is changed to a state where the USB cable is coupled to the USB coupling section 63 after the power is turned on, the third detection condition is satisfied, and the control section 50 executes the measurement process.

In step S18, the control section 50 executes a threshold value acquisition process. In this process, the control section 50 acquires the threshold value corresponding to the USB power supply standard from the memory. When this process is completed, the control section 50 shifts the process to step S19.

In step S19, the control section 50 determines whether or not the power loss value acquired in step S17 exceeds the threshold value acquired in step S18. When it is determined that the power loss value exceeds the threshold value, the control section 50 shifts the process to step S20. On the other hand, when the control section 50 determines that the power loss value does not exceed the threshold value, the control section 50 shifts the process to step S22 without executing steps S20 and S21.

In step S20, the control section 50 executes a mode change process. In this process, the control section 50 changes from the mode corresponding to the standard of the USB power supply to the mode corresponding to the power loss value.

To give a specific example, although the mode corresponding to the standard of the USB power supply is the high-output mode, the control section 50 changes the mode from the high-output mode to the middle-output mode when the power loss value exceeds the threshold value and the mode corresponding to the power loss value is the middle-output mode. Although the mode corresponding to the standard of the USB power supply is the low-output mode, the control section 50 may be shut down, when the power loss value exceeds the threshold value. When this process is completed, the control section 50 shifts the process to step S21.

In this way, when the power loss value acquired in the measurement process does not exceed the threshold value, the control section 50 controls the mode corresponding to the result of the USB negotiation. On the other hand, when the power loss value acquired in the measurement process exceeds the threshold value, the control section 50 controls the mode to a mode in which the power consumption is smaller than the mode corresponding to the result of the USB negotiation.

Specifically, after deciding on the high-output mode based on the USB negotiation, the control section 50 can control to the middle-output mode when the acquired power loss value exceeds the threshold value. After deciding on the middle-output mode based on the USB negotiation, the control section 50 can control to the low-output mode when the acquired power loss value exceeds the threshold value.

In this way, the control section 50 controls to any one of the plurality of types of modes based on the result of the USB negotiation and the measurement result acquired in the measurement process. As a specific example, after the control section 50 decides on the high-output mode based on the USB negotiation, when the acquired power loss value exceeds the threshold value as a result of the USB cable being coupled to the USB coupling section 63, the control section 50 can control to the middle-output mode. In step S21, the control section 50 executes a mode change notification process. In this process, the control section 50 notifies that the mode has been changed to the low power consumption mode based on the power loss of the USB cable. When this process is completed, the control section 50 shifts the process to step S22.

In step S22, the control section 50 executes a reference voltage setting process. In this process, the control section 50 outputs the reference voltage value corresponding to the set mode to the comparison section 73. The reference voltage value is a threshold value with respect to the second voltage Vm2, and is a threshold value corresponding to the standard of the USB power supply. When this process is completed, the control section 50 shifts the process to step S23.

In step S23, the control section 50 executes a mode notification process. In this process, the control section 50 notifies the set mode. When this process is finished, the control section 50 finishes the mode setting process.

Notification Mode

Here, an aspect of notification in the mode setting process will be described with reference to FIG. 8. As shown in FIG. 8, the notification is performed in a mode corresponding to the set mode. To be more specific, when the high-output mode is set, the first light emitting section 28A is lit in green, a mode image indicating the high-output mode is displayed on the liquid crystal display section 30, and a first sound is outputted from the audio output section 28C. When the middle-output mode is set, the first light emitting section 28A blinks in green, a mode image indicating the middle-output mode is displayed on the liquid crystal display section 30, and a second sound is outputted from the audio output section 28C. When the low-output mode is set, the first light emitting section 28A is lit in yellow, a mode image indicating the low-output mode is displayed on the liquid crystal display section 30, and a third sound is outputted from the audio output section 28C.

When the mode is changed to the low power consumption mode based on the power loss of the USB cable, a mode change image is displayed on the liquid crystal display section 30, and a warning sound is output from the audio output section 28C. The mode change image and the warning sound are information indicating that the mode has been changed to a mode with lower power consumption than the mode corresponding to the standard of the USB power supply. The mode change image and the warning sound are also information that enables identifying that the power loss value exceeds the threshold value.

When the system is shut down without being controlled to any of the plurality of types of modes, the first light emitting section 28A is lit in red, an image indicating that the system is shut down is displayed on the liquid crystal display section 30, and a shutdown sound is output from the audio output section 28C. The first sound, the second sound, the third sound, the warning sound, and the shutdown sound are different sounds.

Thus, in step S21, the control section 50 causes the liquid crystal display section 30 to display the mode change image when the power loss value acquired in the measurement process exceeds the threshold value. In particular, the control section 50 causes the liquid crystal display section 30 to display the mode change image even when the power loss value exceeds the threshold and control is performed to the low-output mode after the middle-output mode decided on based on the result of the USB negotiation. In this way, the control section 50 causes the liquid crystal display section 30 to display information that enables identifying the measurement result acquired in the measurement process. Further, the control section 50 outputs a warning sound from the audio output section 28C.

In step S23, the control section 50 causes the liquid crystal display section 30 to display the mode image. The mode image is information that enables identifying the set mode. In particular, the mode image is information that enables identifying the mode that has been changed when the mode is changed to a mode with low power consumption. The control section 50 causes the first light emitting section 28A to emit light in a light emitting mode corresponding to the set mode.

More specifically, when the power loss value acquired in the measurement process does not exceed the threshold value, the control section 50 causes the first light emitting section 28A and the liquid crystal display section 30 to display information that enables identifying the mode corresponding to the result of the USB negotiation. On the other hand, when the power loss value acquired in the measurement process exceeds the threshold value, the control section 50 causes the first light emitting section 28A and the liquid crystal display section 30 to display information that can identify a mode in which the power consumption is smaller than the mode corresponding to the result of the USB negotiation.

To be more specific, after deciding on the high-output mode in accordance with the result of the USB negotiation, when controlling to the middle-output mode based on the result of the measurement process, the control section 50 causes the first light emitting section 28A and the liquid crystal display section 30 to display information that can identify the middle-output mode. After deciding on the middle-output mode in accordance with the result of the USB-negotiation, when controlling to the low-output mode based on the result of the measurement process, the control section 50 causes the first light emitting section 28A and the liquid crystal display section 30 to display information that enables identifying the low-output mode.

The control section 50 causes the audio output section 28C to output a sound corresponding to the set mode. Specifically, in the case of controlling to the high-output mode, the control section 50 outputs the first sound from the audio output section 28C. The control section 50 outputs the second sound from the audio output section 28C in the case of controlling to the middle-output mode. The control section 50 outputs the third sound from the audio output section 28C in the case of controlling to the low-output mode.

Power Supply Monitoring Process

Next, the power supply monitoring process will be described with reference to FIG. 9. The power supply monitoring process is a process that is called each predetermined period of time.

Figure 9:
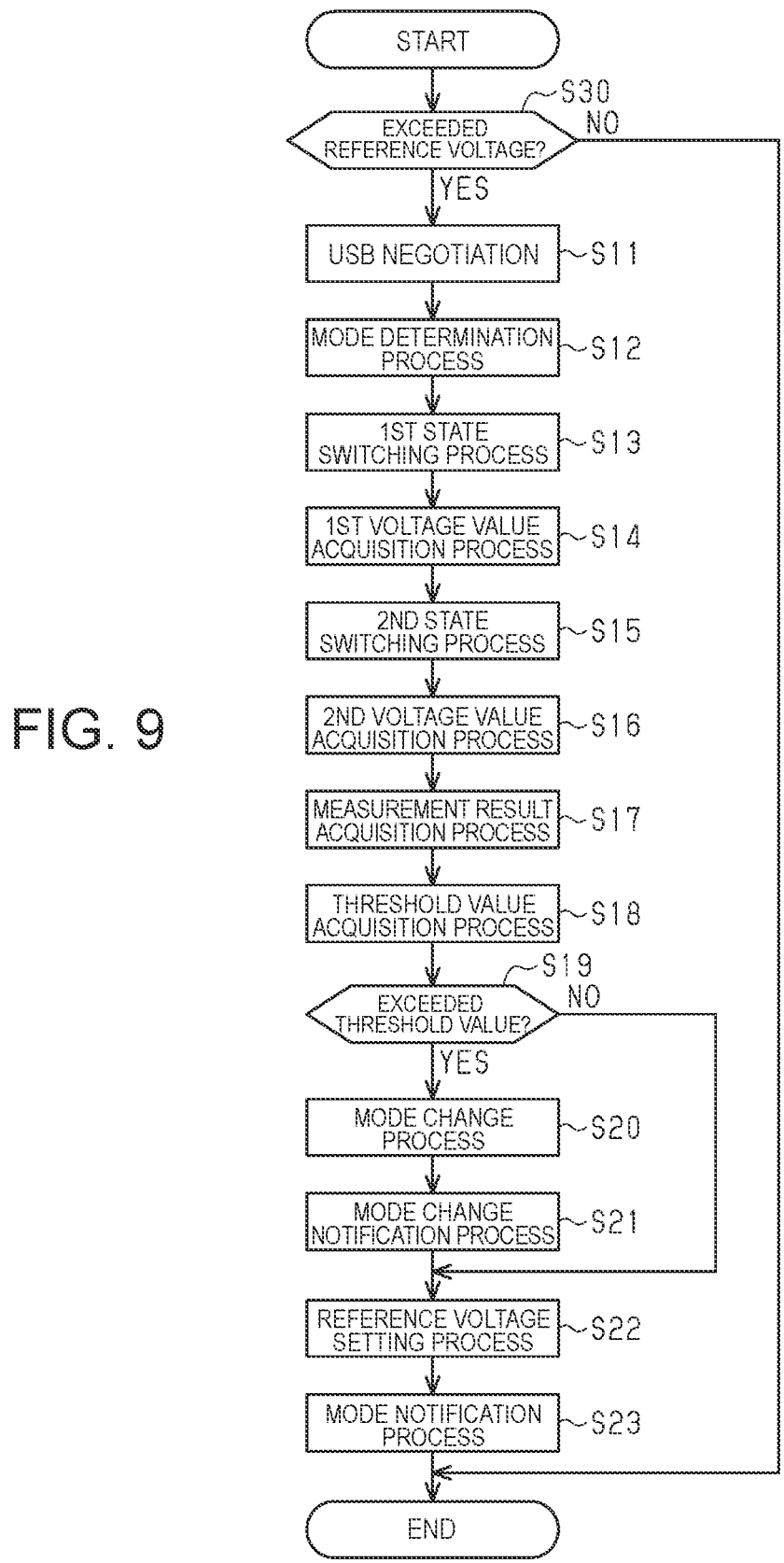
FIG. 9 is a flowchart showing a power supply monitoring process.

As shown in FIG. 9, in step S30, the control section 50 determines whether or not the voltage Vm measured by the measurement section 70 exceeds the reference voltage based on the signal from the comparison section 73. In other words, the control section 50 determines whether or not the power loss value exceeds the threshold value based on the signal from the comparison section 73. When it is determined that the voltage Vm does not exceed the reference voltage, the control section 50 ends the power supply monitoring process. On the other hand, when the control section 50 determines that the voltage Vm exceeds the reference voltage value, the control section 50 does not execute steps S11 and S12 of the mode setting process shown in FIG. 7, and proceeds to step S13. In step S13 and subsequent steps, the control section 50 executes a process similar to the mode setting process. In this way, the control section 50 executes the measurement process based on the comparison result by the comparison section 73.

Display Change Process

Next, the display change process will be described with reference to FIG. 10. The display change process is a process that is called each predetermined period of time.

Figure 10:
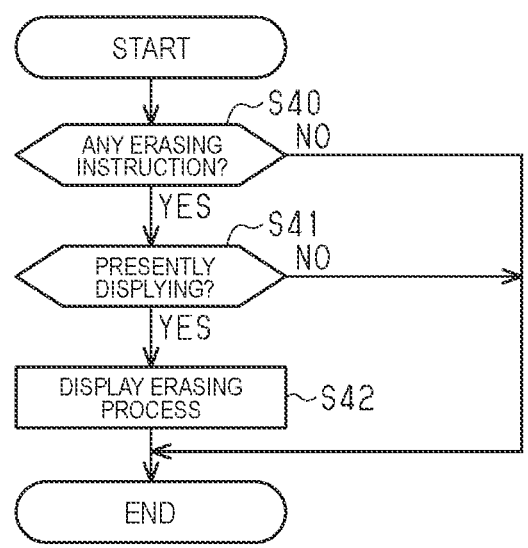
FIG. 10 is a flowchart showing a display change process.

As shown in FIG. 10, in step S40, the control section 50 determines whether or not there is an erasing instruction from the user. The erasing instruction may be input by the user in response to an operation on the operation section 27 or the touch panel 29. If the control section 50 determines that there is no erasing instruction from the user, the control section 50 ends the display change process. On the other hand, in a case where it is determined that there is a erasing instruction from the user, the control section 50 causes the process to proceed to step S41.

In step S41, the control section 50 determines whether a mode image is being displayed on the liquid crystal display section 30. When the control section 50 determines that the mode image is not being displayed on the liquid crystal display section 30, the control section 50 ends the display change process. On the other hand, when the control section 50 determines that the mode is being displayed on the liquid crystal display section 30, the control section 50 shifts the process to step S42.

In step S42, the control section 50 executes a display erasing process. In this process, the control section 50 controls the liquid crystal display section 30 so as to erase the mode image displayed on the liquid crystal display section 30. As described above, when a deletion instruction is input by the user after the mode image is displayed on the liquid crystal display section 30, the control section 50 controls the liquid crystal display section 30 to delete the mode image. When this process ends, the control section 50 ends the display change process.

Action and Effects of First Embodiment

The operations and effects of the first embodiment will be described.

(1) When a power source is turned on, the control section 50 determines one of a plurality of mode types based on a USB negotiation, and then makes the liquid crystal display section 30 display information that enables identifying the decided-on mode. Therefore, when the power is turned on, after the mode is automatically decided on based on the USB negotiation, the decided-on mode can be identified by the user. Thus, it is possible to provide the user with useful information associated with the power supplied from the USB device. Therefore, the convenience of the user can be improved.

(2) After the control section 50 decides on the high-output mode based on the USB negotiation, when the power loss value exceeds the threshold value, the control section 50 can control to the middle-output mode in which the power consumption is smaller than that of the high-output mode. Then, when controlling to the middle-output mode, the control section 50 causes the liquid crystal display section 30 to display a mode image that enables identifying the middle-output mode. Therefore, even if the high-output mode is controlled to the middle-output mode based on the USB negotiation when the power loss value exceeds the threshold value, the user can specify the control to the middle-output mode. Thus, it is possible to provide the user with useful information associated with the power supplied from the USB device. Therefore, the convenience of the user can be improved.

(3) After the middle-output mode decided on based on the USB negotiation, when the power loss value exceeds the threshold value, the control section 50 can control to the low-output mode in which the power consumption is smaller than that of the middle-output mode. When controlling to the low-output mode, the control section 50 causes the liquid crystal display section 30 to display a mode image that enables identifying the low-output mode. Therefore, even if the middle-output mode is controlled to the low-output mode based on the USB negotiation when the power loss value exceeds the threshold value, the user can identify the control to the low-output mode. Thus, it is possible to provide the user with useful information associated with the power supplied from the USB device. Therefore, the convenience of the user can be improved.

(4) When the reading command is input, the control section 50 causes the reading section 40 to control corresponding to the decided-on mode. Therefore, when the reading command is input, the control corresponding to the controlled mode can be automatically performed. Thus, it is possible to provide the user with useful information associated with the power supplied from the USB device. Therefore, the convenience of the user can be improved.

(5) When a reading command is input, the control section 50 causes the reading section 40 to read an image at 90 ppm when the control mode is the high-output mode, and causes the reading section 40 to read an image at 20 ppm, which is slower than 90 ppm, when the control mode is the middle-output mode. Therefore, when the reading command is input, the image can be automatically read at the reading speed corresponding to the controlled mode. Thus, it is possible to provide the user with useful information associated with the power supplied from the USB device. Therefore, the convenience of the user can be improved.

(6) The control section 50 outputs the first sound from the audio output section 28C when controlling to the high-output mode, and outputs the second sound different from the first sound from the audio output section 28C when controlling to the middle-output mode. Therefore, the user can identify the mode to be controlled by sound. Thus, it is possible to provide a situation in which the user can easily identify the mode to be controlled. Therefore, the convenience of the user can be improved.

(7) When the power loss value exceeds the threshold, the control section 50 causes the liquid crystal display section 30 to display information that enables identifying that the power loss value has exceeded the threshold. Therefore, it is possible to provide a situation in which the user can be identified that the power loss value related to the power loss by the USB cable has exceeded the threshold value. Therefore, the convenience of the user can be improved.

(8) After deciding on the high-output mode based on the USB negotiation, when the power loss value exceeds the threshold value as a result of the USB cable being coupled to the USB coupling section 63, the control section 50 can control to the middle-output mode. Then, when controlling to the middle-output mode, the control section 50 causes the liquid crystal display section 30 to display a mode image that enables identifying the middle-output mode. Therefore, in the case where the USB cable is coupled to the USB coupling section 63, when the power loss value exceeds the threshold value, even if the control is performed to the middle-output mode in which the power consumption is smaller than that of the high-output mode, the control to the middle-output mode can be identified by the user. Thus, it is possible to provide the user with useful information associated with the power supplied from the USB device. Therefore, the convenience of the user can be improved.

(9) When an instruction is input by the user after the information that enables identifying the decided-on mode is displayed on the liquid crystal display section 30, the control section 50 erases the mode image that enables identifying the decided-on mode. Therefore, it is possible to increase the possibility that the user identifies the mode. Therefore, the convenience of the user can be improved.

(10) The USB coupling section 63 and the first light emitting section 28A are provided so as to be visually checkable from a predetermined direction. Therefore, it is easy to check visually the USB coupling section 63 to which the USB cable can be coupled and the first light emitting section 28A to which the controlled mode can be identified. In this way, it is possible to provide a situation in which the user can easily identify the mode to be controlled after the USB cable is coupled to the USB coupling section 63. Therefore, the convenience of the user can be improved.

(11) The USB coupling section 63 and the second light emitting section 28B are provided so as to enable a visual check from a predetermined direction. Therefore, it is easy to check visually the USB coupling section 63 to which the USB cable can be coupled and the second light emitting section 28B by which the status of the wireless communication can be identified. In this way, it is possible to provide a situation in which the user can easily specify the status of the wireless communication after the USB cable is coupled to the USB coupling section 63. Therefore, the convenience of the user can be improved.

(12) Based on the first voltage Vm1 measured in the first state and the second voltage Vm2 measured in the second state, the control section 50 executes the measurement process of acquiring the measurement result related to the power loss caused by the USB cable coupled to the USB coupling section 63. Based on the result of the USB negotiation and the measurement result acquired in the measurement process, the control section 50 controls the reading section 40 to one of a plurality of types of modes related to reading.

Particularly in recent years, since a USB standard for supplying power with a large current has appeared, there has been a concern about the influence of power loss due to the USB cable. Further, in the USB standard in which power is supplied with a large current, a resistor having a large resistance value must be used to calculate the power loss value. Further, in the related art, when the supply voltage Vo from the USB device varies, the difference from the supply voltage Vo defined in the USB standard becomes large, and an error may occur in the power loss value calculated from the supply voltage Vo defined in the USB standard.

Therefore, in the present embodiment, by measuring the voltage by switching between the first state and the second state, it is possible to increase the accuracy of the measurement related to the power loss due to the USB cable even when a resistor having a small resistance value is used. In addition, it is possible to suppress the influence of the voltage supplied from the USB device. Thus, the power loss due to the USB cable can be appropriately detected. Therefore, the convenience of the user can be improved.

In addition, it is not necessary to use a measurement section in which the resistance is variable, and it is possible to achieve space saving of the image reading device 11 without increasing the cost of the image reading device 11. Therefore, the convenience of the user can be improved.

(13) When the power is turned on in a state where the USB cable is coupled to the USB coupling section 63, the control section 50 executes the measurement process. Therefore, when the power supply is turned on, the measurement process is automatically executed, whereby the power loss due to the USB cable can be appropriately detected. Therefore, the convenience of the user can be improved.

(14) After the power supply is turned on, when the USB cable is coupled to the USB coupling section 63 from a state in which the USB cable is not coupled to the USB coupling section 63, the control section 50 executes the measurement process. Therefore, when the USB cable is coupled to the USB coupling section 63, the measurement process is automatically performed, and thus it is possible to appropriately detect the power loss due to the USB cable. Therefore, the convenience of the user can be improved.

(15) When an instruction is input by the user after the power is turned on, the control section 50 executes the measurement process. Then, the control section 50 causes the liquid crystal display section 30 to display information that enables identifying the measurement result acquired in the measurement process. Therefore, the power loss due to the USB cable can be appropriately detected by executing the measurement process at the timing intended by the user. Therefore, the convenience of the user can be improved.

(16) When the power loss value acquired in the measurement process does not exceed the threshold value, the control section 50 controls the mode corresponding to the result of the USB negotiation. On the other hand, when the power loss value acquired in the measurement process exceeds the threshold value, the control section 50 controls the mode to a mode in which the power consumption is lower than the mode corresponding to the result of the USB negotiation. Therefore, when the power loss value exceeds the threshold, it is possible to control to a mode with lower power consumption than the mode corresponding to the result of the USB negotiation. Thus, even when the power loss due to the USB cable becomes large, the image can be read from the document D in the mode in which the power consumption is reduced. Therefore, the convenience of the user can be improved.

(17) When the power loss value acquired in the measurement process exceeds the threshold value, the control section 50 causes the liquid crystal display section 30 to display a mode image that enables identifying a mode having a lower power consumption than the mode corresponding to the result of the USB negotiation. Therefore, in a case where the power loss due to the USB cable increases, even when the control is performed in the mode in which the power consumption is reduced, it is possible to cause the user to identify that the control is performed in the mode in which the power consumption is reduced. Therefore, the convenience of the user can be improved.

(18) The control section 50 causes the liquid crystal display section 30 to display information that enables identifying the measurement result acquired in the measurement process. Therefore, the user can specify the measurement result identified in the measurement process. Therefore, the convenience of the user can be improved.

(19) The control section 50 executes the measurement process based on the comparison result obtained by comparing the voltage measured by the measurement section 70 with the reference voltage. Therefore, by using the comparison result, the control load of the control section 50 can be reduced by reducing the execution frequency of the measurement process, and the power loss due to the USB cable can be detected at an appropriate timing. Therefore, the convenience of the user can be improved.

Modifications

The present embodiment can be modified as follows. The present embodiment and the following modifications can be implemented in combination with each other within a range that is not technically contradictory.

It is desirable that the first light emitting portion 28A can be visually checked from a predetermined direction together with the USB coupling section 63. The first light emitting section 28A may be provided on the same surface as the USB coupling section 63. In this case, the same surface may be a flat surface or a curved surface.

It is desirable that the second light emitting section 28B can be visually checked from a predetermined direction together with the USB coupling section 63. The second light emitting section 28B may be provided on the same surface as the USB coupling section 63. In this case, the same surface may be a flat surface or a curved surface.

The operation section 27 may be provided at a position to be able to check visually from a predetermined direction together with the first light emitting section 28A, the second light emitting section 28B, and the USB coupling section 63.

The control section 50 may notify information in a terminal device (not shown) coupled to the image reading device 11. The control section 50 may perform control related to image reading based on a user instruction input from a terminal device (not shown) coupled to the image reading device 11.

The control section 50 may cause the first light emitting section 28A to emit light in a light emitting mode corresponding to the mode change image. The first light emitting section 28A may light in orange when the middle-output mode is set based on the result of the USB negotiation, and may blink in orange when the mode is changed to the middle-output mode based on the power loss of the USB cable. That is, the first light emitting section 28A may notify that the mode has been changed by blinking in a color corresponding to the mode.

When the control section 50 control to the low-output mode based on the power loss of the USB cable, the control section 50 may control the liquid crystal display section 30 to be disabled after the display of the mode change image and the mode image is erased in the liquid crystal display section 30. When the control section 50 controls the low-output mode based on the power loss of the USB cable, the control section 50 may control the liquid crystal display section 30 to be disabled without displaying the mode change image and the mode image on the liquid crystal display section 30.

The liquid crystal display section 30 may display at least one of the mode change image and the mode image by an icon or the like instead of an image indicating a character, or may be a combination thereof.

The mode change notification process of the mode setting process shown in FIG. 7 may be executed after the detection condition is satisfied. In other words, the mode change notification process may be executed regardless of whether it is the reading control period or not. The mode notification process of the mode setting process, shown in FIG. 7, may be executable after the detection condition is satisfied. That is, the mode notification process may be executed regardless of whether or not it is in the reading control period.

When the power loss value exceeds the threshold value, the control section 50 may notify the degree of power loss based on the power loss value. When the power loss value exceeds the threshold value, the control section 50 may notify the difference between the power loss value and the threshold value. When the power loss value exceeds the threshold value, the control section 50 may notify different information based on the power loss value. Specifically, when the difference between the power loss value and the threshold value is small, the control section 50 may notify information indicating the replacement of the USB cable, and when the difference between the power loss value and the threshold value is large, the control section 50 may notify information prompting a maintenance contact.

When the power loss value does not exceed the threshold value, the control section 50 may notify the degree of power loss based on the power loss value. When the power loss value does not exceed the threshold value, the control section 50 may notify the difference between the power loss value and the threshold value. The control section 50 may notify information that enables identifying the standard of the USB power supply. The control section 50 may notify information that enables identifying the communication speed of the USB. The control section 50 may notify information that enables identifying the USB standard itself.

The detection condition may include at least one of the first detection condition, the second detection condition, and the third detection condition, or may include another detection condition.

When the detection condition is satisfied and the power loss value exceeds the threshold value in the measurement process, triggered by the input of the reading command, the control section 50 may notify information that enables identifying that the power loss value exceeds the threshold value without starting the reading of the image.

The control section 50 may erase the mode change image when a predetermined time elapses even if the user does not give an erase instruction. The control section 50 may not erase the mode change image based on the instruction of the user.

When the AC adapter serves as the power supply source in a state where the AC adapter cable is coupled to the AC adapter coupling section 62, steps S13 to S23 of the mode setting process, shown in FIG. 7, may not be executed. The detection condition may be established in step S10 of the mode setting process, shown in FIG. 7, when the AC adapter cable is not coupled to the AC adapter coupling section 62 and the USB device becomes the power supply source.

The coupling section 61 may include a battery coupling section. The battery coupling section can be coupled to a battery cable. That is, the battery coupling section can be coupled to a battery as a power supply source via the battery cable. The image reading device 11 may include a battery. That is, a battery may be built in the image reading device 11, for example.

In the power supply monitoring process shown in FIG. 8, when the control section 50 determines that the voltage Vm exceeds the reference voltage, the control section 50 may execute steps S11 and S12 of the mode setting process shown in FIG. 7.

In the above-described embodiment, for example, at least one of the movement of the paper feed tray 16, the movement of the paper discharge tray 17, and the posture change of the housing 12 may be realized by a user's operation. As a result, even when at least one of the movement of the paper feed tray 16, the movement of the paper discharge tray 17, and the posture change of the housing 12 is disabled, it can be realized by the operation of the user. For example, at least one of the movement of the paper feed tray 16, the movement of the paper discharge tray 17, and the posture change of the housing 12 may not be realized by drive of the driving source. That is, for example, the paper feed tray 16 may not be moved. Further, for example, the paper discharge tray 17 may not be moved. Further, for example, the posture of the housing 12 may not be changed.

In the above-described embodiment, for example, the control section 50 may increase the illuminance of the backlight of the liquid crystal display section 30 in the high-output mode and the middle-output mode, and may decrease the illuminance of the backlight of the liquid crystal display section 30 in the low-output mode.

In the above embodiment, for example, the control section 50 may disable the notification section 28 in the low-output mode.

In the above embodiment, for example, the image reading device 11 may not be provided with the touch panel 29. For example, the image reading device 11 may not be provided with the liquid crystal display section 30. For example, the image reading device 11 may not include the operation section 27. For example, the image reading device 11 may not be provided with the notification section 28.

In the above embodiment, the control section 50 controls in the middle-output mode in the same manner as in the low-output mode, but the control content is not limited thereto, and for example, the control may be performed in the same manner as in the high-output mode, unlike the low-output mode. As a specific example, the control section 50 may control the multifeed sensor 35 to be valid in the high-output mode and the middle-output mode.

In the above embodiment, the control section 50 controls in the middle-output mode in the same manner as in the high-output mode, but may control in the same manner as in the low-output mode, unlike the high-output mode, for example. As a specific example, the control section 50 may not drive the posture drive motor 49 in the middle-output mode and the low-output mode.

In the above-described embodiment, for example, the control section 50 may control at least one of the control contents corresponding to the plurality of types of modes shown in FIG. 6.

In the above-described embodiment, the second position P2 may be a position other than the input terminal of the USB cable, but is preferably a position close to the input terminal of the USB cable.

In the above-described embodiment, the control section 50 outputs a signal for controlling to the first state to the switching section 72, but may control to the second state by not outputting a signal for controlling to the first state to the switching unit 72. In the above-described embodiment, the state is controlled to the second state at normal times. But the state may be controlled to the first state at normal times.

In the above-described embodiment, for example, the image reading device 11 may be configured to read an image at any one of two types and four or more types of reading speeds. Further, for example, the reading speed may be an arbitrary speed.

In the above-described embodiment, four USB standards are exemplified, but the present disclosure is not limited thereto, and the present disclosure may be applied to, for example, two standards, three standards, or five or more standards. That is, at least a plurality of USB devices capable of supplying power included in different power ranges may be capable to coupled. Further, for example, each power range may be an arbitrary range.

In the above-described embodiment, for example, the image reading device 11 may include a plurality of USB coupling sections 63. That is, a plurality of USB devices can be coupled to the image reading device 11. In this case, the control section 50 may decide the power supply source from among the plurality of USB devices in accordance with the priority. Further, the control section 50 may control the mode of the plurality of USB devices in accordance with the priority order.

In the above-described embodiment, for example, the USB device may be a host device or a device.

In the above-described embodiment, for example, for a USB device, the power range may be any power range. Further, for example, as long as power included in the same power range can be supplied to the USB devices, the power themselves may be the same or different.

In the above-described embodiment, the four power supply sources of the AC adapter, the high-power supply USB device, the middle-power supply USB device, and the low-power supply USB device are exemplified, but the present disclosure is not limited thereto. For example, the image reading device 11 may be capable of being supplied with power from one of two or more, three or less, or five or more power supply sources. That is, as for the power supply source, for example, a power supply source different from the power supply sources exemplified above may be included, and for example, at least one of the power supply sources exemplified above may not be included.

In the above-described embodiment, three modes are adopted as the plurality of modes, but the present disclosure is not limited to this. For example, any one of two modes and four or more modes may be adopted as the plurality of modes.

In the above-described embodiment, for example, the control section 50 may not perform USB negotiation with a USB device, triggered by power-on. For example, the control section 50 may not perform USB negotiation with the USB device, triggered by an instruction from the user. For example, the control section 50 may not perform the USB negotiation with the USB device, triggered by the change in the connection state with the USB device. That is, the control section 50 may perform USB negotiation with the USB device, triggered by at least one of power-on, an instruction from the user, and a change in the connection state with the USB device.

The image sensor 42 is not limited to a CMOS image sensor. The image sensor 42 may be, for example, a Metal Oxide Semiconductor (MOS) image sensor or a Charge Coupled Device (CCD) image sensor.

The image sensor 42 is not limited to a linear image sensor, and may be, for example, an area image sensor.

The material of the document is not limited to paper, and may be, for example, a resin film or sheet, a fabric, a metal film, or the like.

The image reading device is not limited to a sheet feed type, and may be a flat bed type. The flatbed image reading device includes a carriage and a carriage motor. The carriage is movable along the main scanning direction D2 by drive of a carriage motor. A reading section is mounted on the carriage.

The image reading device 11 may be a part of a multi-function peripheral having a printing function and a copying function in addition to the scanner function. The present disclosure is applied to the image reading device 11, but is not limited thereto. For example, the present disclosure may be applied to a recording device. The recording device includes a recording section that performs recording on a medium. The present disclosure may be applied to an electronic device.

As used herein, the phrase "at least one of" means one or more of the desired alternatives. As an example, the phrase "at least one of" as used herein means only one option if the number of options is two, or both of the two options. As another example, the expression "at least one of" as used herein means only one option or a combination of any two or more options when the number of options is three or more.

Note

Hereinafter, technical ideas grasped from the above embodiments and modifications, and operations and effects thereof, will be described.

(A1) An image reading device includes a reading section configured to read an image from a document, a control section configured to perform control related to reading of an image from document, a display section configured to display information, and a USB coupling section configured to couple with a USB cable, wherein the control section is configured to control to any mode amongst a plurality of types of modes with different power consumption, and when power is turned on, the control section decides on one of the plurality of mode types based on a USB negotiation, and then causes the display section to display information that enables identifying the decided-on mode.

According to this configuration, when the power is turned on, after the mode is automatically decided on based on the USB negotiation, the decided-on mode can be identified by the user. Thus, it is possible to provide the user with useful information associated with the power supplied from the USB device. Therefore, the convenience of the user can be improved.

(B1) In the above-described image reading device, the plurality of mode types includes a first mode and a second mode, the second mode is a mode in which power consumption is smaller than in the first mode, the control section is configured to acquire a measurement value related to power loss due to a USB cable being coupled to the USB coupling section, and after deciding on the first mode based on the USB negotiation, the control section may be configured to, after deciding on the first mode based on the USB negotiation, control to the second mode when the acquired measurement value exceeds a threshold value and to cause the display section to display information that enables identifying the second mode when the mode is to be controlled to the second mode.

According to this configuration, when the measured value exceeds the threshold value, even if the mode is controlled to the second mode in which the power consumption is smaller than the first mode based on the USB negotiation, the user can identify control to the second mode. Thus, it is possible to provide the user with useful information associated with the power supplied from the USB device. Therefore, the convenience of the user can be improved.

(C1) In the above-described image reading device, the plurality of mode types includes a third mode, the third mode is a mode in which power consumption is smaller than in the second mode, and when the acquired measurement value exceeds a threshold value after the second mode decided on based on the USB negotiation, the control section may be configured to control the mode to the third mode when the acquired measurement value exceeds a threshold value after the second mode decided on based on the USB negotiation and to cause the display section to display information that enables identifying the third mode when the mode is to be controlled to the third mode.

According to this configuration, when the measured value exceeds the threshold value, even if the mode is controlled to the third mode in which the power consumption is smaller than the second mode based on the USB negotiation, the user can identify the control to the third mode. Thus, it is possible to provide the user with useful information associated with the power supplied from the USB device. Therefore, the convenience of the user can be improved.

(D1) In the above-described image reading device, when a reading command is input, the control section may cause the reading section to control corresponding to the decided-on mode among the plurality of mode types.

According to this configuration, when the reading command is input, the control corresponding to the controlled mode is automatically performed. In this way, the user can identify that the control corresponding to the controlled mode is performed. Thus, it is possible to provide the user with useful information associated with the power supplied from the USB device. Therefore, the convenience of the user can be improved.

(E1) In the above-described image reading device, the plurality of mode types includes a first mode and a second mode, the second mode is a mode in which power consumption is smaller than in the first mode, and when a reading command is input in the first mode, the control section may cause the reading section to read an image at a first reading speed, and when a reading command is input in the second mode, the control section may cause the reading section to read an image at a second reading speed lower than the first reading speed.

According to this configuration, when the reading command is input, the image is automatically read from the document at the reading speed corresponding to the controlled mode. In this way, the user can identify that the image is to be read at a reading speed corresponding to the mode being controlled. Thus, it is possible to provide the user with useful information associated with the power supplied from the USB device. Therefore, the convenience of the user can be improved.

(F1) The above-described image reading device includes an audio output section configured to output sound, wherein the plurality of mode types includes a first mode and a second mode, the second mode is a mode in which power consumption is smaller than in the first mode, and the control section may cause the audio output section to output a first sound in the first mode, and may cause the audio output section to output a second sound different from the first sound in the second mode.

According to this configuration, the user can identify the mode to be controlled by voice. Thus, it is possible to provide a situation in which the user can easily identify the mode to be controlled. Therefore, the convenience of the user can be improved.

(G1) In the above-described image reading device, the control section is configured to acquire a measurement value related to power loss due to a USB cable coupled to the USB coupling section after deciding on one of the plurality of mode types, and the control section may cause the display section to display information that enables identifying that the measurement value exceeds a threshold value when the acquired measurement value exceeds the threshold value.

According to this configuration, it is possible to provide a situation in which the user can identify that the measurement value related to the power loss due to the USB cable exceeds the threshold value. Therefore, the convenience of the user can be improved.

(H1) In the above-described image reading device, the plurality of mode types includes a first mode and a second mode, the second mode is a mode in which power consumption is smaller than in the first mode, the control section is configured to acquire a measurement value related to power loss due to a USB cable being coupled to the USB coupling section, and after deciding on the first mode based on the USB negotiation, when an acquired measurement value exceeds a threshold as a result of a USB cable being coupled to the USB coupling section, the control section controls to change to the second mode, and when controlling to change to the second mode, the control section may cause the display section to display information that enables identifying the second mode.

According to this configuration, in a case where the USB cable is coupled to the USB coupling section, when the measurement value exceeds the threshold value, even if the control is performed in the second mode in which the power consumption is smaller than that in the first mode, the user can specify the control to the second mode. Thus, it is possible to provide the user with useful information associated with the power supplied from the USB device. Therefore, the convenience of the user can be improved.

(I1) The above-described image reading device includes an input section configured to be input with a command by a user, wherein the display section is configured to enable erasing displayed information, and the control section causes the display section to display the information that enables identifying the decided-on mode, and then may cause the control section to erase the information that enables identifying the decided-on mode when a command by the user is input by the input section.

According to this configuration, the information that enables identifying the mode is erased by inputting the command by the user. This makes it possible to increase the possibility of the user identifying the mode. Therefore, the convenience of the user can be improved.

(J1) In the above-described image reading device, the display section includes a first light emitting section that emits light in a light emitting mode that enables identifying the mode controlled to, and the USB coupling section and the first light emitting section may be provided so as to be check visually from a predetermined direction.

According to this configuration, it is easy to visually check the USB coupling section to which the USB cable can be coupled and the first light emitting section to which the controlled mode can be identify. In this way, it is possible to provide a situation in which the user can easily identify the mode to be controlled after the USB cable is coupled to the USB coupling section. Therefore, the convenience of the user can be improved.

(K1) In the above-described image reading device, the display section includes a second light emitting section that emits light in a light emitting mode that enables identifying a state of wireless communication, and the USB coupling section and the second light emitting section may be provided so as to enable a visual check from a predetermined direction.

According to this configuration, it is easy to visually check the USB coupling section to which the USB cable can be coupled and the second light emitting section that enables identifying the situation of the wireless communication. In this way, it is possible to provide a situation in which the user can easily identify the status of the wireless communication after the USB cable is coupled to the USB coupling section. Therefore, the convenience of the user can be improved.

(L1) An image reading method of an image reading device, the image reading device including a reading section configured to read an image from a document, a control section configured to perform control related to the reading of the image from the document, a display section configured to display information, and a USB coupling section configured to couple with a USB cable, the image reading method includes, when power is turned on, the control section decides on one of a plurality of mode types having different power consumption based on a USB negotiation, and then causes the display section to display information that enables identifying the decided-on mode. According to this configuration, the same effect as in (A1) can be obtained.

(A2) An image reading device includes a reading section configured to read an image from a document, a control section configured to perform control related to reading of an image from document, a USB coupling section configured to couple with a USB cable, a measurement section configured to measure a voltage value supplied from a USB cable in a state where the USB cable is coupled to the USB coupling section, a measuring resistance that is used when a voltage value is measured by the measurement section, and a switching section at least configured to switch between a first state in which the measurement section and the measuring resistor are coupled and a second state in which the measurement section and the measuring resistance are not coupled, wherein the control section configured to execute the USB negotiation in a state where the USB cable is coupled to the USB coupling section, is configured to control the switching section to switch to one of the first state and the second state, and execute a measurement process of acquiring a measurement result related to power loss due to a USB cable coupled to the USB coupling section based on a first voltage value measured by the measurement section in the first state and a second voltage value measured by the measurement section in the second state, and based on the result of the USB negotiation and the measurement result acquired in the measurement process, controls to one of a plurality of mode types related to the reading of the reading section.

According to this configuration, by measuring the voltage value by switching between the first state and the second state, it is possible to increase the accuracy of the measurement related to the power loss due to the USB cable even when a resistor having a small resistance is used. In addition, it is possible to suppress the influence of the voltage supplied from the USB device. Thus, the power loss due to the USB cable can be appropriately detected. Therefore, the convenience of the user can be improved.

(B2) In the above-described image reading device, the control section may execute the measurement process when power is turned on in a state where a USB cable is coupled to the USB coupling section.

According to this configuration, when the power supply is turned on, the measurement process is automatically executed, so that the power loss due to the USB cable can be appropriately detected. Therefore, the convenience of the user can be improved.

(C2) In the above-described image reading device, the control section may execute the measurement process when a state in which a USB cable is not coupled to the USB coupling section changes to a state in which the USB cable is coupled to the USB coupling section after power is turned on.

According to this configuration, when the USB cable is coupled to the USB coupling section, the measurement process is automatically executed, so that the power loss due to the USB cable can be appropriately detected. Therefore, the convenience of the user can be improved.

(D2) The above-described image reading device may include an input section configured to be input a command by a user, and a display section configured to display information, wherein when the command by a user is input to the input section after power is turned on, the control section executes the measurement process and may cause the display section to display information that enables identifying a measurement result acquired in the measurement process.

According to this configuration, since the measurement process is executed at the timing intended by the user, it is possible to appropriately detect the power loss due to the USB cable. Therefore, the convenience of the user can be improved.

(E2) In the above-described image reading device, the control section may be configured to acquire, as a measurement result, a measurement value related to power loss due to a USB cable coupled to the USB coupling section in the measurement process, and when the measurement value acquired in the measurement process does not exceed a threshold value, the control section may control to a mode corresponding to the result of the USB negotiation, and when the measurement value acquired in the measurement process exceeds the threshold value, the control section may control to a mode having a lower power consumption than the mode corresponding to the result of the USB negotiation.

According to this configuration, when the measured value of the power loss by the USB cable exceeds the threshold value, a mode can be controlled to the mode in which the power consumption is lower than that of the mode corresponding to the result of the USB negotiation. Thus, even when the power loss due to the USB cable becomes large, the image can be read from the document in the mode in which the power consumption is reduced. Therefore, the convenience of the user can be improved.

(F2) The above-described image reading device may further include a display section configured to display information, wherein the control section may cause the display section to display information that enables identifying the mode having lower power consumption than the mode corresponding to a result of USB negotiation when a measurement value acquired in the measurement process exceeds the threshold.

According to this configuration, when the power loss due to the USB cable increases, even when the control is performed in the mode in which the power consumption is reduced, it is possible to cause the user to identify that the control is performed in the mode in which the power consumption is reduced. Therefore, the convenience of the user can be improved.

(G2) The above-described image reading device may further include a display section configured to display information, wherein the control section may cause the display section to display information that enables identifying a measurement result acquired in the measurement process.

According to this configuration, the user can identify the information regarding the measurement value. Therefore, the convenience of the user can be improved.

(H2) The above-described image reading device includes a comparison section configured to compare the voltage value measured by the measurement section with a reference voltage value, wherein the control section may execute the measurement process based on a comparison result by the comparison section.

According to this configuration, by using the comparison section, it is possible to reduce the control load of the control section and to detect the power loss due to the USB cable at an appropriate timing. Therefore, the convenience of the user can be improved.

(I2) In an image reading device having a reading section configured to read an image from a document, a control section configured to perform control related to reading of an image from document, a USB coupling section configured to couple with a USB cable, a measurement section configured to measure a voltage value supplied from a USB cable in a state where the USB cable is coupled to the USB coupling section, a measuring resistance that is used when a voltage value is measured by the measurement section, and a switching section at least configured to switch between a first state in which the measurement section and the measuring resistor are coupled and a second state in which the measurement section and the measuring resistance are not coupled, an image reading method of the image reading device includes the control section executes the USB negotiation in a state where the USB cable is coupled to the USB coupling section, and execute a measurement process of acquiring a measurement result related to power loss due to a USB cable coupled to the USB coupling section based on a first voltage value measured by the measurement section in the first state and a second voltage value measured by the measurement section in the second state, and based on the result of the USB negotiation and the measurement result acquired in the measurement process, controls to one of a plurality of mode types related to the reading of the reading section. According to this configuration, the same effect as in (A2) can be obtained.

(J2) In the above-described method of image reading of the image reading device, when the command by a user is input to the input section after power is turned on, the control section may execute the measurement process and may cause the display section to display information that enables identifying a measurement result acquired in the measurement process. According to this configuration, the same effect as (D2) can be obtained.

What is claimed is:

1. An image reading device comprising:
   a reading section configured to read an image from a document;
   a control section configured to perform control related to the reading of the image from the document;
   a display section configured to display information; and
   a USB coupling section configured to couple with a USB cable so as to receive a supply voltage from an external USB device that is also coupled to the USB cable, the received supply voltage from the external USB device being used to power the image reading device, wherein
   the control section is configured to control to any mode amongst a plurality of types of modes with different power consumption and
   when power is turned on, the control section decides on one of the plurality of mode types based on a USB negotiation with the external USB device, the USB negotiation determining a USB standard that is to be used between the image reading device and the external USB device based on the supply voltage the external USB device is able to provide to the image reading device, and then causes the display section to display information that enables identifying the decided-on mode.

2. The image reading device, according to claim 1, wherein
   the plurality of mode types includes a first mode and a second mode,
   the second mode is a mode in which power consumption is smaller than in the first mode,
   the control section is configured to acquire a measurement value related to power loss due to a USB cable being coupled to the USB coupling section, and
   the control section is configured to, after deciding on the first mode based on the USB negotiation, control to the second mode when the acquired measurement value exceeds a threshold value and to cause the display section to display information that enables identifying the second mode when the mode is to be controlled to the second mode.

3. The image reading device, according to claim 2, wherein
   the plurality of mode types further includes a third mode,
   the third mode is a mode in which power consumption is smaller than in the second mode, and
   the control section is configured to control the mode to the third mode when the acquired measurement value exceeds a threshold value after the second mode decided on based on the USB negotiation and to cause the display section to display information that enables identifying the third mode when the mode is to be controlled to the third mode.

4. The image reading device, according to claim 1, wherein
   when a reading command is input, the control section causes the reading section to control corresponding to the decided-on mode among the plurality of mode types.

5. The image reading device, according to claim 4, wherein
   the plurality of mode types includes a first mode and a second mode,
   the second mode is a mode in which power consumption is smaller than in the first mode, and
   when a reading command is input in the first mode, the control section causes the reading section to read an image at a first reading speed, and when a reading command is input in the second mode, the control section causes the reading section to read an image at a second reading speed lower than the first reading speed.

6. The image reading device, according to claim 1, further comprising:
   an audio output section configured to output sound wherein the plurality of mode types includes a first mode and a second mode, the second mode is a mode in which power consumption is smaller than in the first mode, and the control section causes the audio output section to output a first sound in the first mode, and causes the audio output section to output a second sound different from the first sound in the second mode.

7. The image reading device, according to claim 1, wherein the control section is configured to acquire a measurement value related to power loss due to a USB cable coupled to the USB coupling section after deciding on one of the plurality of mode types, and the control section causes the display section to display information that enables identifying that the measurement value exceeds a threshold value when the acquired measurement value exceeds the threshold value.

8. The image reading device according to claim 1, wherein the plurality of mode types includes a first mode and a second mode, the second mode is a mode in which power consumption is smaller than in the first mode, the control section is configured to acquire a measurement value related to power loss due to a USB cable being coupled to the USB coupling section, and after deciding on the first mode based on the USB negotiation, when an acquired measurement value exceeds a threshold as a result of a USB cable being coupled to the USB coupling section, the control section controls to change to the second mode, and when controlling to change to the second mode, the control section causes the display section to display information that enables identifying the second mode.

9. The image reading device, according to claim 1, further comprising:

an input section configured to be input with a command by a user, wherein the display section is configured to enable erasing displayed information, and the control section causes the display section to display the information that enables identifying the decided-on mode, and then causes the control section to erase the information that enables identifying the decided-on mode when a command by the user is input by the input section.

10. The image reading device, according to claim 1, wherein the display section includes a first light emitting section that emits light in a light emitting mode that enables identifying the mode controlled to and the USB coupling section and the first light emitting section are provided so as to be checked visually from a predetermined direction.

11. The image reading device, according to claim 1, wherein the display section includes a second light emitting section that emits light in a light emitting mode that enables identifying a state of wireless communication and the USB coupling section and the second light emitting section are provided so as to enable a visual check from a predetermined direction.

12. The image reading device, according to claim 1, further comprising:

a comparison section configured to compare the voltage value measured by the measurement section with a reference voltage value, wherein the control section executes the measurement process based on a comparison result by the comparison section.

13. An image reading device comprising:

a reading section configured to read an image from a document;

a control section configured to perform control related to the reading of the image from the document;

a display section configured to display information;

a USB coupling section configured to couple with a USB cable;

a measurement section configured to measure a voltage value supplied from a USB cable in a state where the USB cable is coupled to the USB coupling section;

a measuring resistance that is used when a voltage value is measured by the measurement section; and a switching section at least configured to switch between a first state in which the measurement section and the measuring resistor are coupled and a second state in which the measurement section and the measuring resistance are not coupled, wherein the control section is configured to control to any mode amongst a plurality of types of modes with different power consumption, and when power is turned on, the control section decides on one of the plurality of mode types based on a USB negotiation, and then causes the display section to display information that enables identifying the decided-on mode, the control section is configured to:

control the switching section to switch to one of the first state and the second state, execute a measurement process of acquiring a measurement result related to power loss due to a USB cable coupled to the USB coupling section based on a first voltage value measured by the measurement section in the first state and a second voltage value measured by the measurement section in the second state, and based on the result of the USB negotiation and the measurement result acquired in the measurement process, control to one of a plurality of mode types related to the reading of the reading section.

14. The image reading device, according to claim 13, wherein the control section executes the measurement process when power is turned on in a state where a USB cable is coupled to the USB coupling section.

15. The image reading device, according to claim 13, wherein the control section executes the measurement process when a state in which a USB cable is not coupled to the USB coupling section changes to a state in which the USB cable is coupled to the USB coupling section after power is turned on.

16. The image reading device, according to claim 13, further comprising:

an input section configured to be input with a command by a user, wherein when the command by a user is input to the input section after power is turned on, the control section executes the measurement process and causes the display section to display information that enables identifying a measurement result acquired in the measurement process.

17. The image reading device, according to claim 13, wherein
the control section is configured to acquire, as a measurement result, a measurement value related to power loss due to a USB cable coupled to the USB coupling section in the measurement process and
when the measurement value acquired in the measurement process does not exceed a threshold value, the control section controls to a mode corresponding to the result of the USB negotiation, and when the measurement value acquired in the measurement process exceeds the threshold value, the control section controls to a mode having a lower power consumption than the mode corresponding to the result of the USB negotiation.

18. The image reading device, according to claim 13, wherein
the control section causes the display section to display information that enables identifying the mode having lower power consumption than the mode corresponding to a result of USB negotiation when a measurement value acquired in the measurement process exceeds the threshold.

19. The image reading device, according to claim 13, wherein
the control section causes the display section to display information that enables identifying a measurement result acquired in the measurement process.

20. An image reading method of an image reading device, the image reading device including a reading section configured to read an image from a document, a control section configured to perform control related to the reading of the image from the document, a display section configured to display information, and a USB coupling section configured to couple with a USB cable so as to receive a supply voltage from an external USB device that is also coupled to the USB cable, the received supply voltage from the external USB device being used to power the image reading device, the image reading method comprising:
when power is turned on, the control section decides on one of a plurality of mode types having different power consumption based on a USB negotiation with the external USB device, the USB negotiation determining a USB standard that is to be used between the image reading device and the external USB device based on the supply voltage the external USB device is able to provide to the image reading device, and then causes the display section to display information that enables identifying the decided-on mode.

* * * * *